(12) United States Patent
Matera et al.

(10) Patent No.: US 8,177,358 B2
(45) Date of Patent: May 15, 2012

(54) POLARIZED EYEWEAR

(75) Inventors: Pasquale Matera, Plainview, NY (US); David Kessler, Rochester, NY (US)

(73) Assignee: SOL-Grid, LLC., Rochester, NY (US)

( * ) Notice: Subject to any disclaimer, the term of this patent is extended or adjusted under 35 U.S.C. 154(b) by 171 days.

(21) Appl. No.: 12/838,580

(22) Filed: Jul. 19, 2010

(65) Prior Publication Data

US 2010/0283957 A1    Nov. 11, 2010

Related U.S. Application Data

(63) Continuation-in-part of application No. 12/248,342, filed on Oct. 9, 2008, now Pat. No. 7,771,045.

(51) Int. Cl.
*G02C 7/12* (2006.01)

(52) U.S. Cl. ............... 351/49; 351/44; 351/163; 349/13

(58) Field of Classification Search ............ 351/41, 351/44, 49, 163; 349/9, 13; 359/485.01, 359/487.03, 489.14
See application file for complete search history.

(56) References Cited

U.S. PATENT DOCUMENTS

| | | | | |
|---|---|---|---|---|
| 4,261,656 | A * | 4/1981 | Wu | 351/163 |
| 7,113,336 | B2 * | 9/2006 | Crosby | 359/485.05 |
| 7,480,017 | B2 | 1/2009 | Fisher et al. | |
| 7,771,045 | B2 * | 8/2010 | Matera et al. | 351/49 |
| 7,878,649 | B2 * | 2/2011 | Archambeau et al. | 351/159 |

* cited by examiner

*Primary Examiner* — Huy K Mai
(74) *Attorney, Agent, or Firm* — Louis S. Horvath

(57) ABSTRACT

An article of polarized eyewear has a lens, with a first substrate lens material transparent to visible light and a pattern of elongated structures formed from at least a second material having a complex index of refraction, wherein the second material is deposited directly onto a curved surface of the first substrate lens material. A pitch between adjacent elongated structures is less than 300 nm and a width of each elongated structure is less than 90% of the pitch. A photochromic material is deposited onto the polarized eyewear.

20 Claims, 34 Drawing Sheets

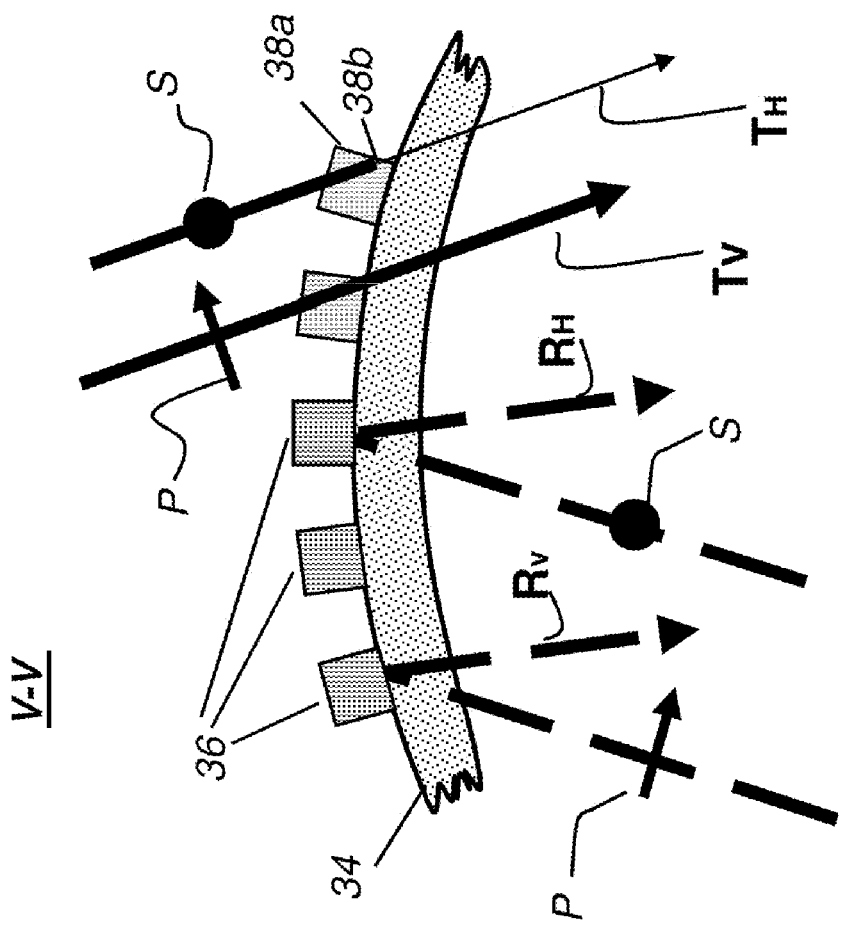

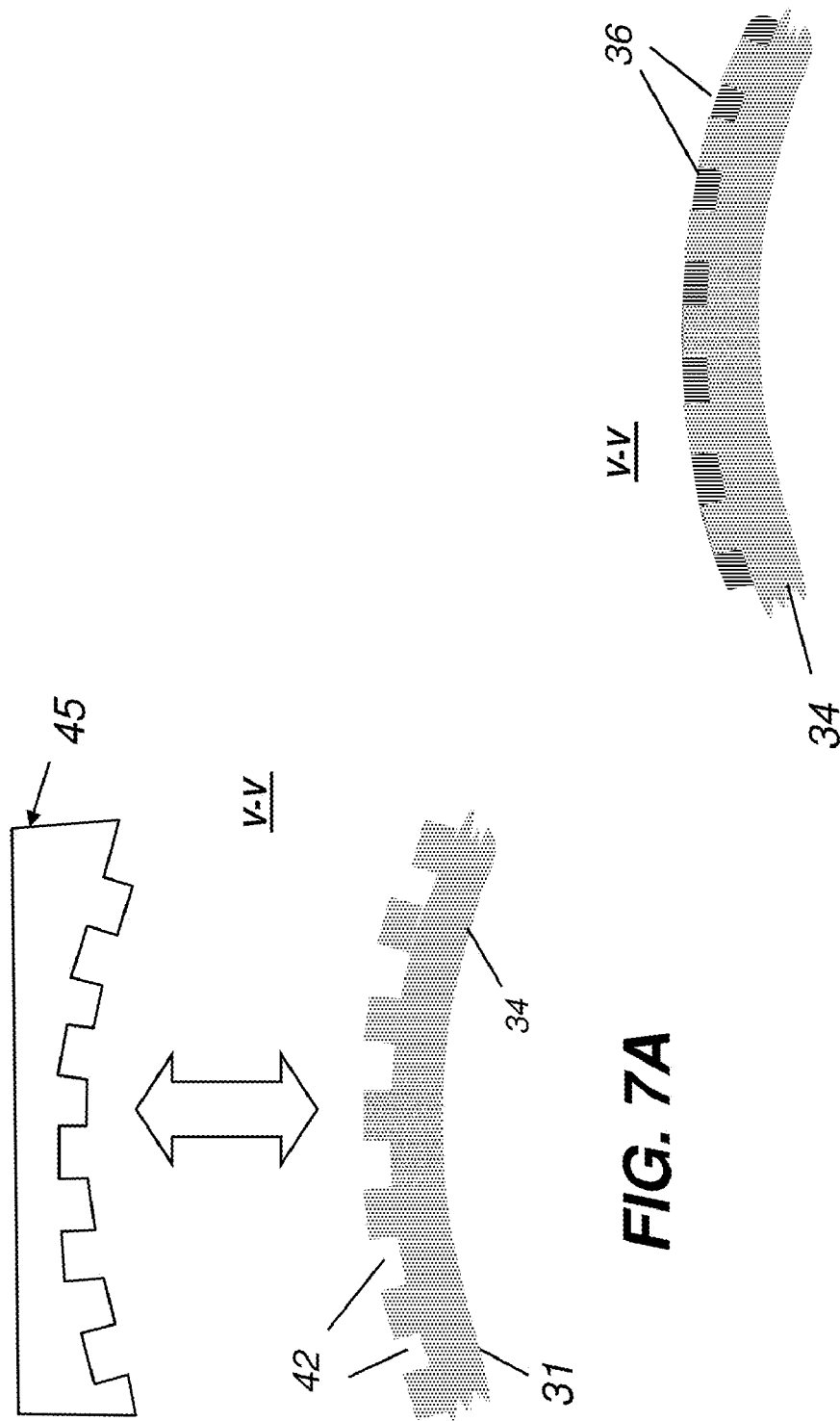

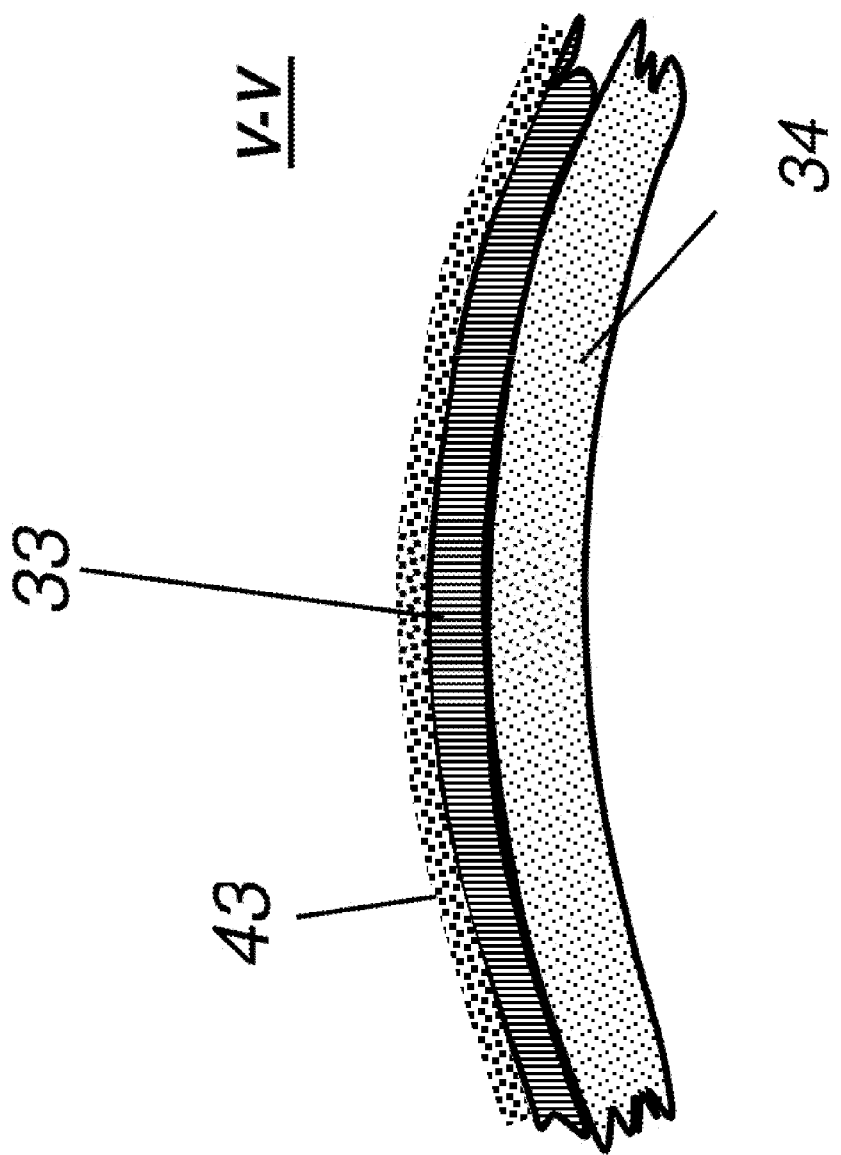

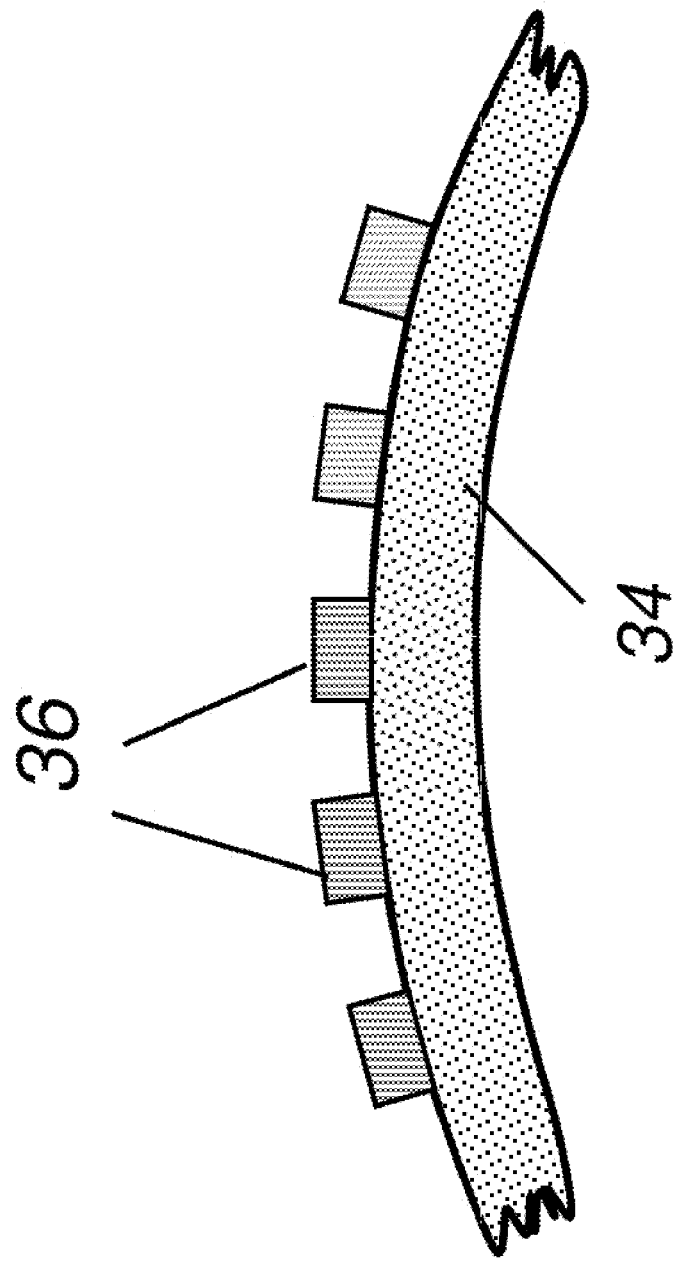

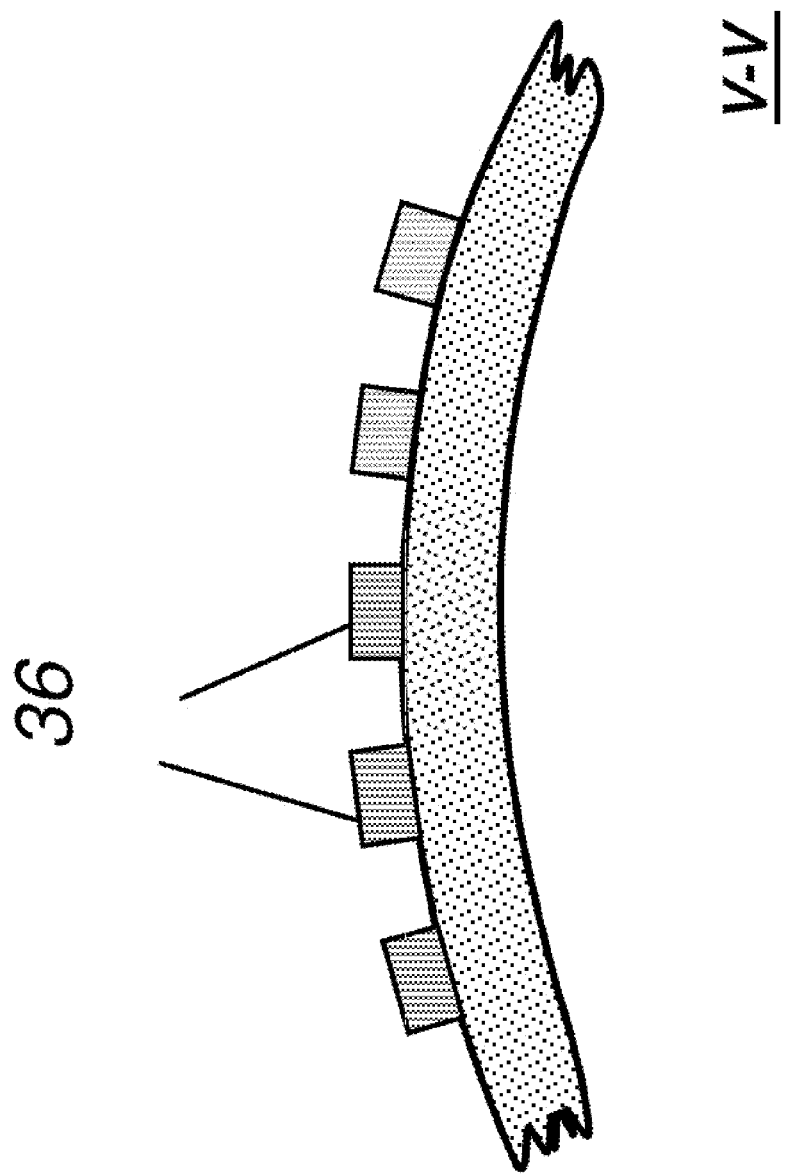

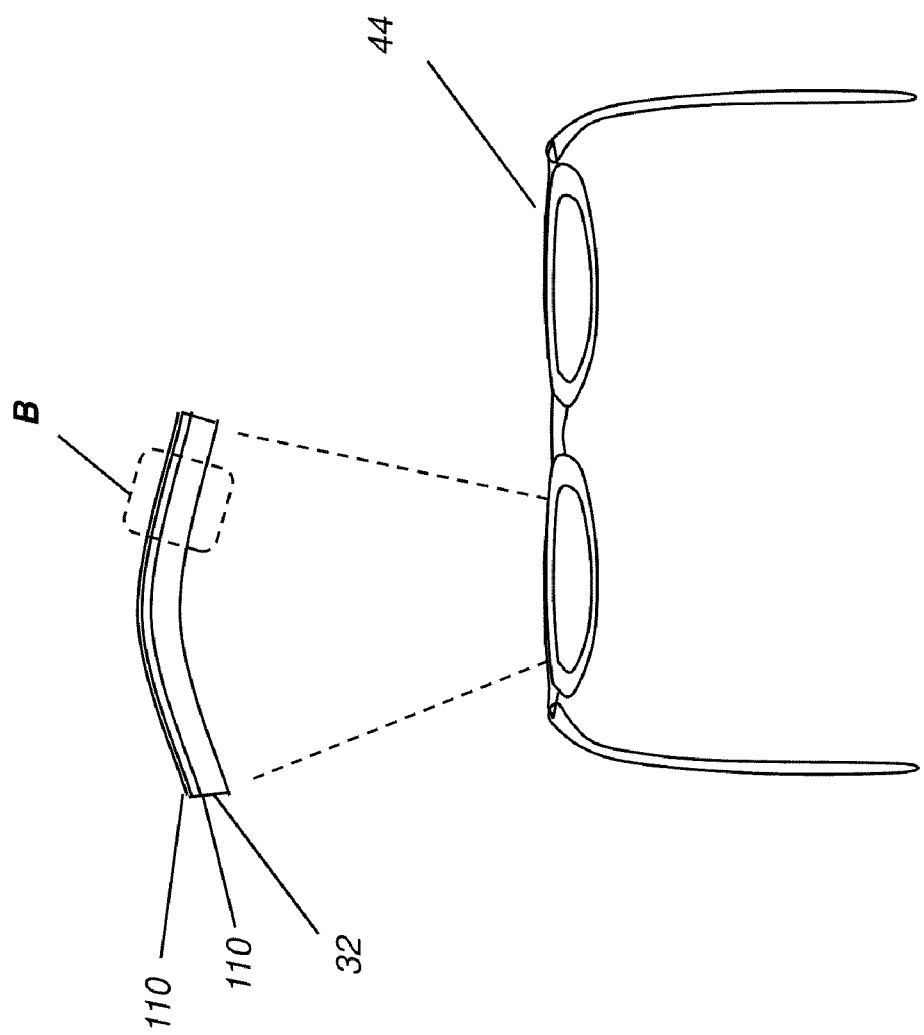

POLARIZED EYEWEAR

CROSS REFERENCE TO RELATED APPLICATIONS

The present application is a continuation-in-part of commonly assigned co-pending U.S. patent application Ser. No. 12/248,342 filed 9 Oct. 2008 by Matera et al. and entitled POLARIZED EYEWEAR.

FIELD OF THE INVENTION

The present invention relates generally to polarizing sunglasses and other types of eyewear and more particularly relates to polarized eyewear embodiments in 3D imaging and in variable opacity eyewear.

BACKGROUND OF THE INVENTION

Polarized lenses have been used in sunglasses and other types of eyewear for a number of years and have proved to be of particular value in reducing glare and other potentially irritating effects for the wearer. The conventional fabrication method for polarizer material uses a layering in which a sheet of polarized film material is sandwiched or laminated between outer layers of a glass or plastic. The polarizer material itself is a thin sheet of polymer that has its molecules aligned or oriented, such as by stretching in one direction. Subsequent treatment, such as with dyes and lamination, forms a single axis polarizer sheet that can then be used for sunglasses and other eyewear.

It is known that glare is predominantly horizontally polarized light, since horizontally polarized light reflects much more strongly off a flat surface than does vertically polarized light. Therefore, in order to minimize glare and reduce excessive outdoor brightness, polarizing sunglasses are generally designed to block a higher percentage of horizontally polarized light and transmit a portion of vertically polarized light. Referring to FIG. 1, incoming light from the sun or other bright source impinges on a horizontal object 10 having a top specular surface 11. Surface 11 could be, for example, a thin layer of water covering object 10. Light reflecting off specular surface 11 is glare. The incoming sunlight or other light is unpolarized or randomly polarized light. Light reflected from surface 11 is more highly s-polarized, as represented schematically in FIG. 1; light scattered from object 10 just under top surface 11 is commonly unpolarized. Well-designed polarized eyewear 12, with its polarization transmission axis well-aligned, generally blocks s-polarized light and transmits p-polarized light. For conventional polarized sunglasses, for example, a vertical transmission axis, shown as V in FIG. 1, is most appropriate.

Having a suitable polarization axis, then, helps polarized sunglasses to reduce glare and other effects. However, in practice, maintaining the best polarization axis for viewing through polarized eyewear can be difficult. Certainly, some amount of viewer head movement is inevitable and can be difficult to compensate while maintaining desired polarization. But a more significant problem for maintaining the preferred polarization axis relates to lens shape and sunglass design. Conventional polarizers do not easily adapt to "wraparound" lens shapes or to more highly curved spherical and "sun-lens" designs. Designs that require more than minimal bending and curving of the polarized plastic and designs with curvature about more than one axis tend to cause inconsistent and non-uniform stretching of the polarizer material and can easily warp and degrade the performance of the polarizer film. Further, fabrication methods such as thermoforming, commonly used to bend and adapt plastic materials to conform to a given shape or curvature, can induce stress into the polarizer material, thereby deforming any parallel molecular pattern that was provided for obtaining polarization in the first place. A stretched pattern of molecules can be warped out of their intended alignment by any type of shaping operation, making the corresponding polarizer less effective, compromising the extinction ratio in an irregular fashion over the lens surface, leading to an inconsistent polarization pattern across the field of view, and even introducing image aberrations and artifacts into the lens. In extreme cases, this effect can be distracting, can lead to image distortion, and might even be hazardous for the viewer.

Yet another problem with conventional polarizer fabrication relates to waste. Because of the nature of handling thin plastic substrates, stretching of the polarizer film itself is a relatively imprecise process that is difficult to control, and the end-product is often subject to non-uniformity. It has proven to be difficult to provide the uniform stress pattern needed for maintaining a polarization axis and relative success or failure may not be known until after fabrication has been completed. This, in turn, leads to reduced yields.

Because of these problems, polarized lens material, available only for designs with limited curvatures, more uniform cylindrical curvatures, and simpler shapes, is often difficult to adapt to eyewear design and consumer tastes. Difficulties in controlling the polarization axis for any particular lens shape constrain the ability of lens designers to take advantages of inherent strengths and benefits of polarizers for the eyeglass wearer.

Photochromic materials that become increasingly opaque upon exposure to light have been used for providing sunglasses that adapt their opacity to the ambient light level. Conventional photochromic sunglasses exhibit this behavior according to the relative levels of incident ultraviolet (UV) light, so that the same pair of sunglasses can be worn in bright sunlight and in shaded or indoor lighting conditions. Under bright sunlight, UV levels are high and the photochromic coatings become proportionately more opaque. When the same glasses are worn indoors, the photochromic effect is reversed, with the lens coatings becoming proportionately more transparent.

While the photochromic effect has been found useful for blocking suitable amounts of light under various conditions, however, there are shortcomings to conventional designs. One drawback relates to relatively slow response times, making photochromic behavior less desirable where brightness transitions are sudden and extreme, or where light is intense over only a small portion of the field. Another problem relates to poor spectral response of many photochromic materials for light outside the UV range. Because of these and related problems, there is limited applicability of photochromic benefits to industrial, transportation, or defense safety using conventional design approaches.

Thus, it can be appreciated that there would be advantages for polarized eyewear having variable opacity and capable of responding more quickly to a range of possible incident light conditions.

SUMMARY OF THE INVENTION

It is an object of the present invention to advance the art of polarized and photochromic eyewear. With this object in mind, the present invention provides an article of polarized eyewear having a lens, wherein the lens comprises:

a first substrate lens material transparent to visible light;

a pattern of elongated structures formed from at least a second material having a complex index of refraction, wherein the second material is deposited directly onto a curved surface of the first substrate lens material, wherein a pitch between adjacent elongated structures is less than 300 nm and a width of each elongated structure is less than 90% of the pitch; and a photochromic material deposited onto the polarized eyewear.

It is a feature of the present invention that it applies form-birefringence or structured-birefringence to polarized eyewear. The apparatus and method of the present invention provide polarized eyewear having improved absorption and reflection properties for reducing glare and having a number of advantages related to fabrication technique.

It is an advantage of the present invention that it provides polarized eyewear that allows adaptation to highly curved lens designs and is generally more flexible and adaptable than the conventional stretched-substrate polarizer solutions. It is a further advantage of the present invention that it provides polarized eyewear with reduced back reflection due to light from behind the lenses.

A further advantage of the present invention relates to the capability to change the relative opacity of an eyeglass lens or related eyewear to accommodate incident light conditions or viewer preference.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5B is a vertical cross-sectional view of elongated structures forming a wire grid polarizer on a curved substrate with the transmitted and reflected light shown.

FIGS. 7A, 7B, and 7C show steps in a fabrication sequence for forming an eyeglass lens with a wire-grid polarizer in one embodiment of the present invention.

FIGS. 9A, 9B, and 9C and show steps in a fabrication sequence for forming an eyeglass lens with a wire-grid polarizer in an alternate embodiment of the present invention.

FIGS. 10A, 10B, and 10C show steps in a fabrication sequence for forming an eyeglass lens with a wire-grid polarizer in another alternate embodiment of the present invention.

FIG. 13 is a side view showing polarized eyeglasses having electrochromic material between two wire grid polarizers.

DETAILED DESCRIPTION OF THE INVENTION

Figure 1:
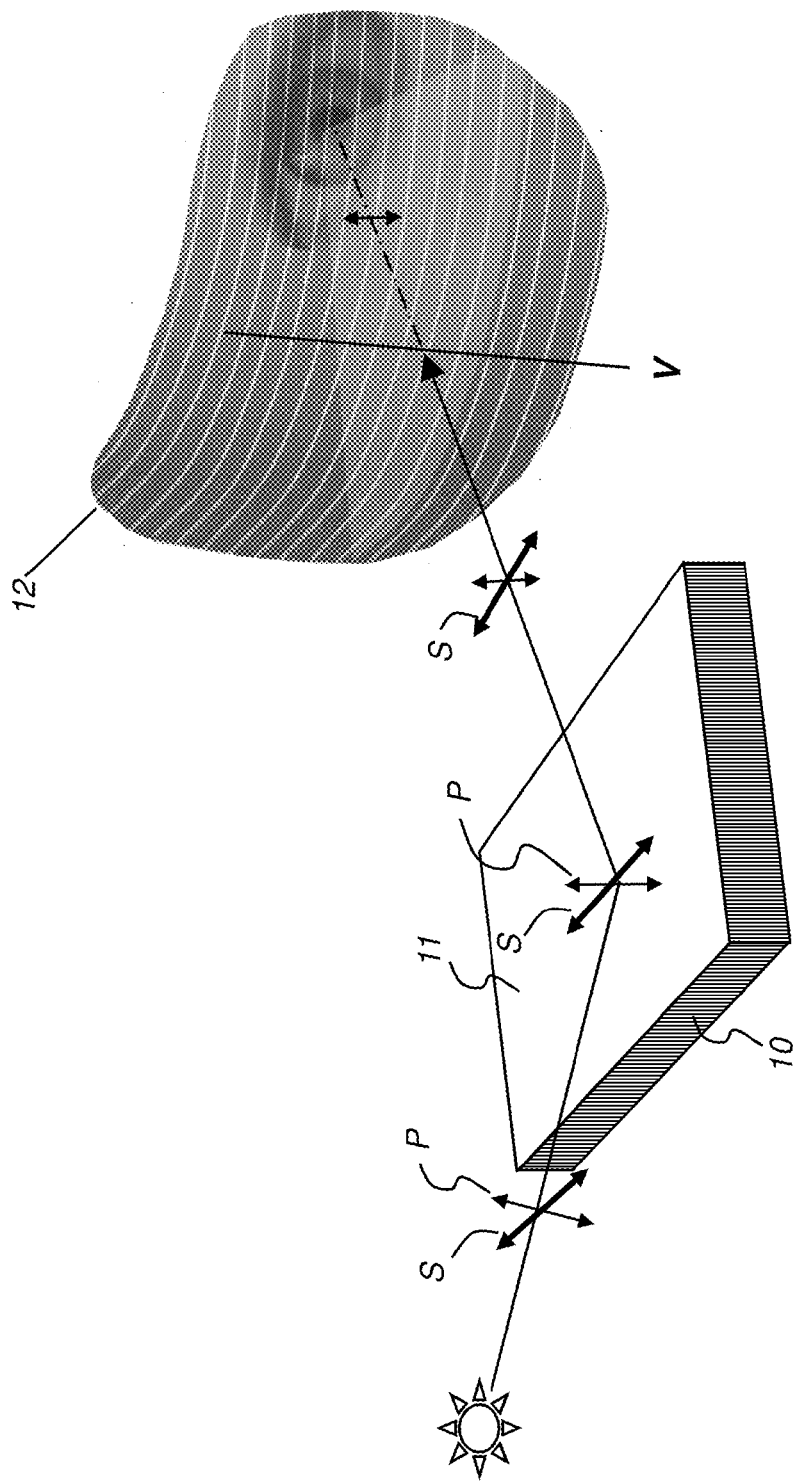
FIG. 1 is a schematic diagram showing the operation of polarized eyewear.

Elements not specifically shown or described may take various forms well known to those skilled in the art. Figures shown and described herein are provided in order to illustrate key principles of operation and component relationships along their respective optical paths or fabrication techniques according to the present invention and are not drawn with intent to show actual size or scale. Some exaggeration may be necessary in order to emphasize basic structural relationships or principles of operation.

In the context of the present disclosure, the term "complex index of refraction" applies where the index of refraction for a material contains both a real component designated commonly as n and a significant imaginary (−i) component, commonly designated as k. Imaginary component k can be considered to be significant where the ratio of k to n satisfies:

$$\frac{k}{n} \geq 0.2$$

For example, metallic aluminum has a complex index of refraction, with its imaginary part k given by k=6.69 and its real part n, given by n=0.96 at wavelength of 500 nm. By contrast, glass and polycarbonate have indices of refraction that are predominantly real, so that the above ratio of k/n is less than 0.2, and would not be considered to be materials having a complex index of refraction. The materials used as a lens substrate in embodiments of the present invention are materials having predominantly real indices of refraction.

In the context of the present disclosure, the term "deposited" refers to any suitable method for applying one material against another and includes practices such as coating, sputtering, forming by growing, chemical vapor deposition, printing, nano-printing, adhesion, electro-plating or electroless plating, oxidation, evaporation, sublimation, plasma deposition, anodization, anodic deposition, molecular beam deposition, atomic layer deposition, or photodeposition, for example.

Historically, wire grid polarizers were first developed for polarization of radio waves, then as sub-wavelength gratings for use as polarizers at infrared and higher wavelengths, well above the visible. More recently, advances in photolithography, interference lithography, and other high-resolution fabrication techniques have expanded the usability of wire grid polarizers to visible wavelengths. As one early example, U.S. Pat. No. 5,383,053 entitled "Virtual image display having a high efficiency grid beam splitter" to Hegg et al. discloses a wire grid polarization beam splitter for the visible region in which parallel metal wires have a pitch that is much less than the visible wavelengths and have features in the 150 nm range. More recently, U.S. Pat. No. 6,108,131, entitled "Polarizer apparatus for producing a generally polarized beam of light" to Hansen et al. and U.S. Pat. No. 6,122,103, entitled "Broadband wire grid polarizer for the visible spectrum" to Perkins et al. describe improved-performance wire grid polarizer devices designed for the visible spectrum.

Wire grid polarizers are a type of photonic crystal, wherein a photonic crystal is the broader category of sub-microscopic, periodic dielectric structures that possess spectral gaps (stop bands) for electromagnetic waves, analogous to energy bands and gaps in semiconductors. A few types of photonic crystal are formed in nature; other types are fabricated, such as one-dimensional photonic crystals formed by stacking multiple dielectric layers, such as a Bragg mirror for example. As fabricated, photonic crystals contain regularly spaced regions having alternately higher and lower dielectric constants. Photons, exhibiting wave behavior, may or may not propagate through this structure, depending on factors such as wavelength, spacing between layers, structures, or features, and indices of refraction. Wire grid polarizers themselves operate according to principles of structured birefringence, also termed "form" or "formed" birefringence. The wire grid polarizer is formed as an array of elongated structures or elongated elements, such as fine parallel metallic wires, that are arranged in a plane at a suitable angle to the incident beam.

Figure 2:
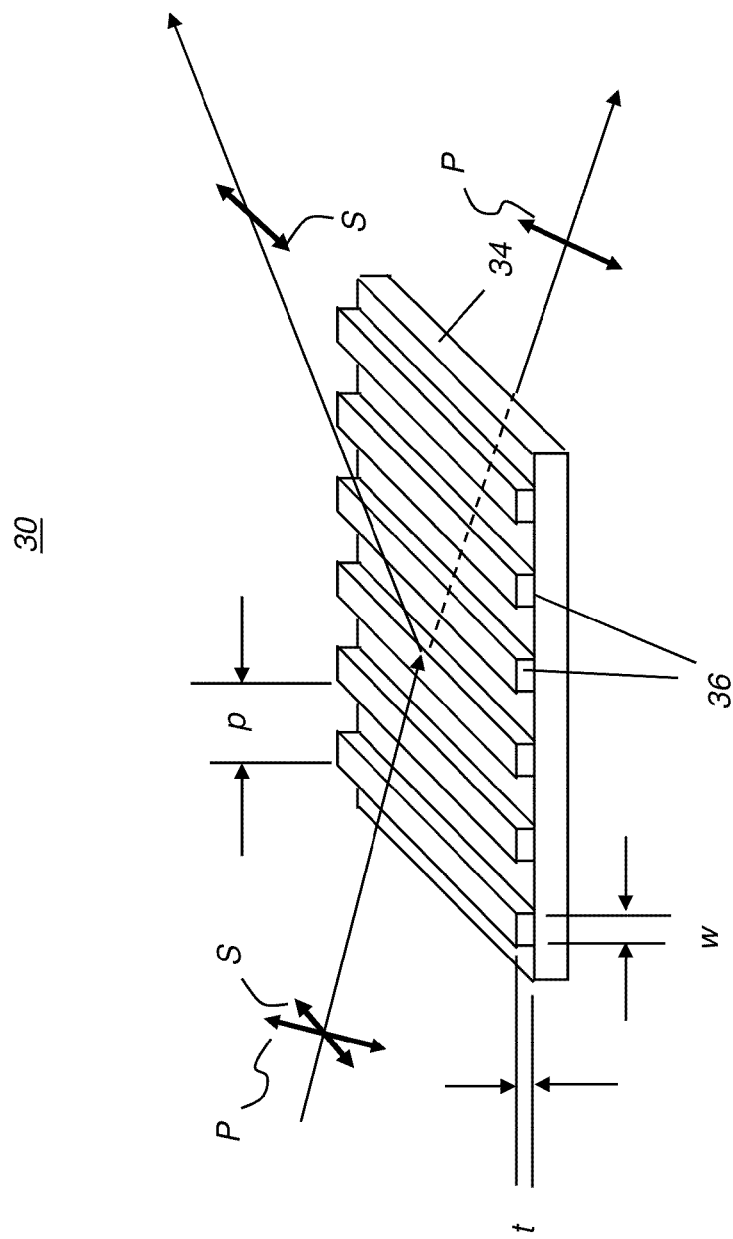
FIG. 2 is a schematic diagram in perspective view of the basic function of a wire grid polarizer with dimensional attributes.

Referring to FIG. 2, the behavior of a wire grid polarizer 30 is shown schematically over a small section of this type of device. Unpolarized light, shown entering at left, is incident on wire grid polarizer 30 and has both s- and p-polarization. Light having s-polarization, with a polarization axis that is parallel to elongated structures 36, is reflected from the surface of wire grid polarizer 30. Light having the orthogonal polarization, shown as p-polarization in FIG. 2, is transmitted through a transparent substrate 34.

Figure 3:
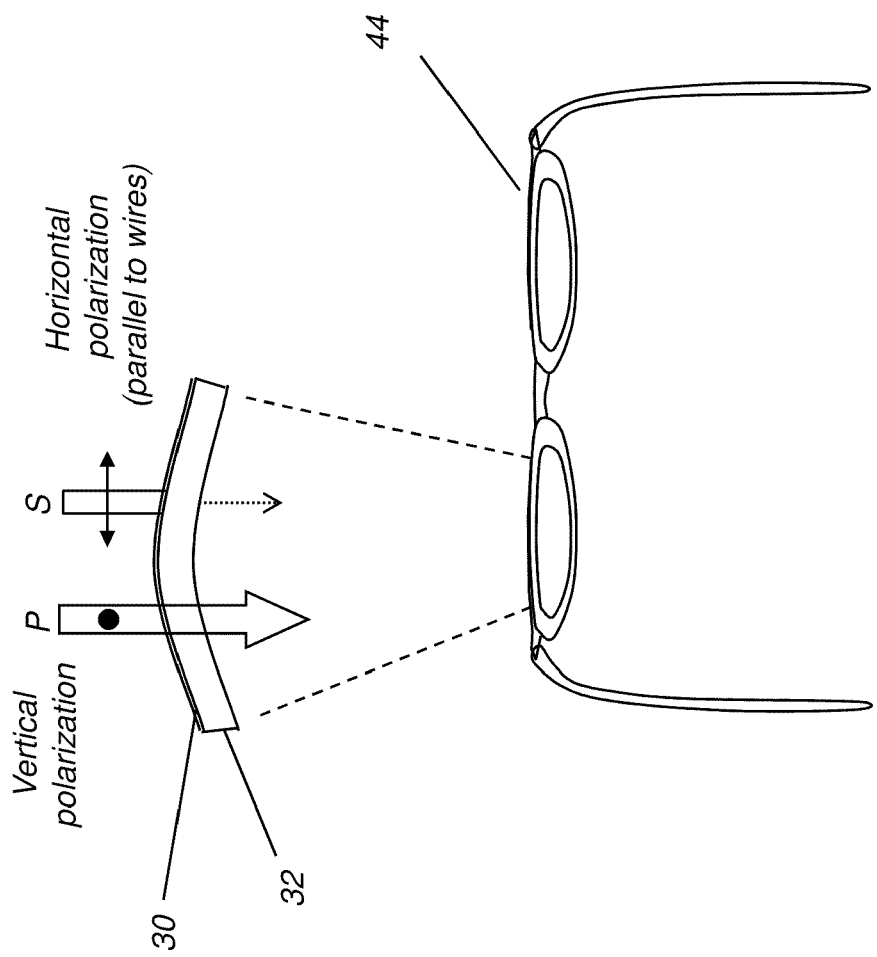
FIG. 3 shows a top view of a lens in a polarized eyewear apparatus in one embodiment and its effect on transmitting the vertical polarization and reducing the horizontal polarization.

The schematic top view of FIG. 3 shows the function of a wire grid polarizer 30 in an eyeglass lens 32 for eyeglasses 44. Here, wire grid polarizer 30 reflects a substantial portion of the s-polarized light that has its polarization axis parallel to the horizontally oriented elongated structures or wires and transmits the bulk of the orthogonal p-polarized light with its axis of polarization in the vertical direction.

Dimensions of Interest

There are a number of dimensional parameters that, when satisfied, allow wire grid polarizer 30 operation, in the manner of a photonic crystal, over the visible range. The perspective cross-sectional view of FIG. 2 shows dimensional requirements that are of particular interest for wire grid polarizer operation:

(i) Pitch p or the period between wires, or more broadly, between adjacent elongated structures 36 must be half the wavelength of the incident visible light, or less than half this wavelength. For conventional sunglass and other eyeglass applications, this means preferably between about 140 to 180 nm, but more generally within the range between about 100 and 300 nm. Near a threshold value of about 300 nm, the polarizer begins to exhibit undesirable grating-like properties, with a portion of the light diffracting into the grating orders. This diffraction effect would potentially create undesirable ghost images perceptible to the wearer of the polarized eyeglasses.

(ii) Width w of elongated structures 36 should be less than 90% of the pitch, more preferably within about 50 to 90 nm.

(iii) Thickness t of elongated structures 36 above the surface of substrate 34 should be within about 70 to 160 nm.

It is also instructive to note that adjacent elongated structures 36 have a segment-wise parallel relationship, in which two or more adjacent elongated structures or equivalent surface features extend in a parallel direction along at least some portion of their length. Elongated structures 36 that form the wire grid may be continuous, extending in unbroken lines across the full surface of the lens. Alternately, one or more elongated structures 36 may be segmented, with a slight gap between segments. In yet other embodiments, elongated structures 36 are composite structures having aligned particles with a suitably elongated shape, as described in subsequent discussion of materials. Elongated structures 36 can alternately have some wavelike form with small deviations from being strictly parallel to one axis of polarization. Adjacent elongated structures are discrete with respect to the width w direction, with a gap between any two adjacent elongated structures.

Materials and Structure of Elongated Structures

Conventional wire grid polarizers are formed using a parallel arrangement of thin aluminum strips that extend across the polarizer surface, generally using a glass substrate.

Embodiments of the present invention can also use aluminum or other metals for elongated structures 36. Some of the other metals that have been used for wire grid polarizers include gold, platinum, chromium, nickel, copper, silver, and tungsten, for example, and other metals such as rhodium may also offer advantages. Metals such as these have complex indices of refraction, as defined earlier, which makes these materials particularly well-suited for use in wire grid polarizers.

Figure 4:
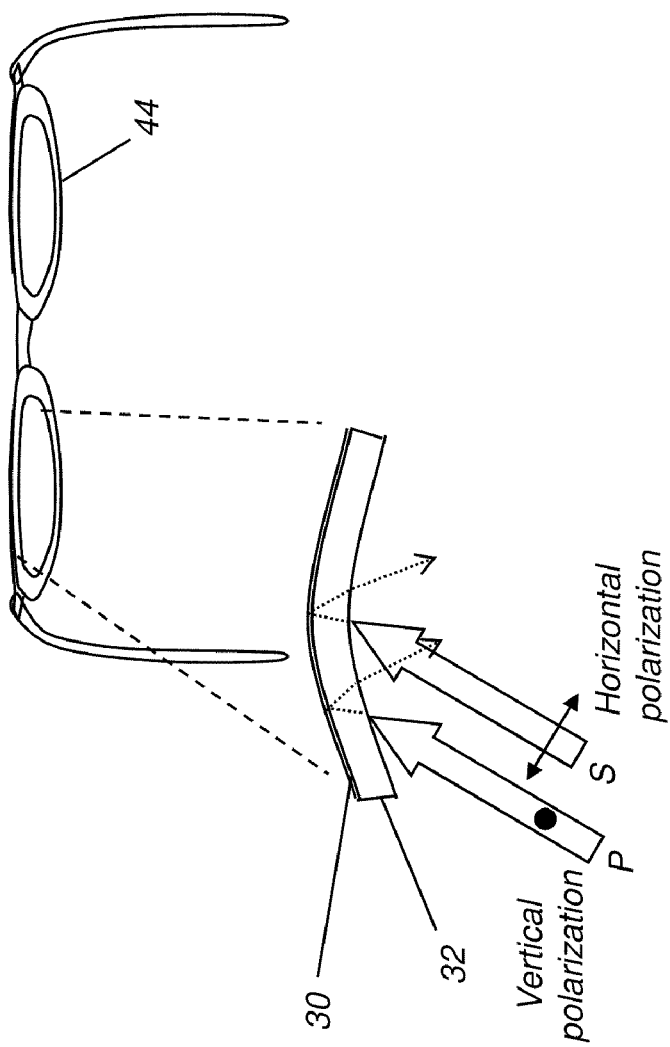
FIG. 4 is a top view of a lens in a polarized eyewear apparatus, showing the effect of reducing the back reflection in both the vertical and horizontal polarizations.

While reflective metals are often used for conventional wire grid devices, however, there can be problems of back-reflection when these are employed on eyeglass surfaces. Referring to FIG. 4, possible paths for light reflected from the eye or otherwise incident from the rear of lens 32, such as light reflected from the viewer's eyes or face, are shown. Anti-reflection (AR) coatings can be used for reducing this back-reflected light somewhat. However, because metallic wires can be highly reflective, additional steps for reducing back-reflection may be needed.

Figure 5A:
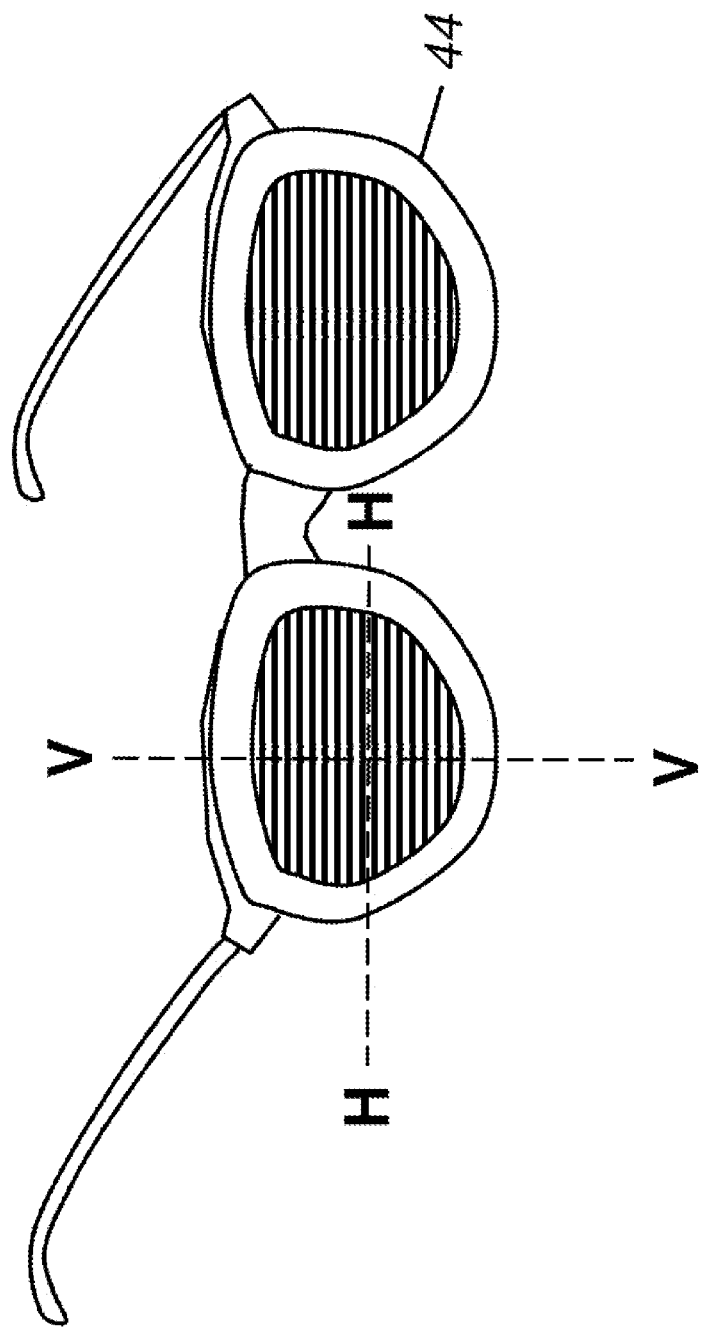
FIG. 5A shows the eyewear with reference directional cross sections in the horizontal and vertical directions.
Figure 5C:
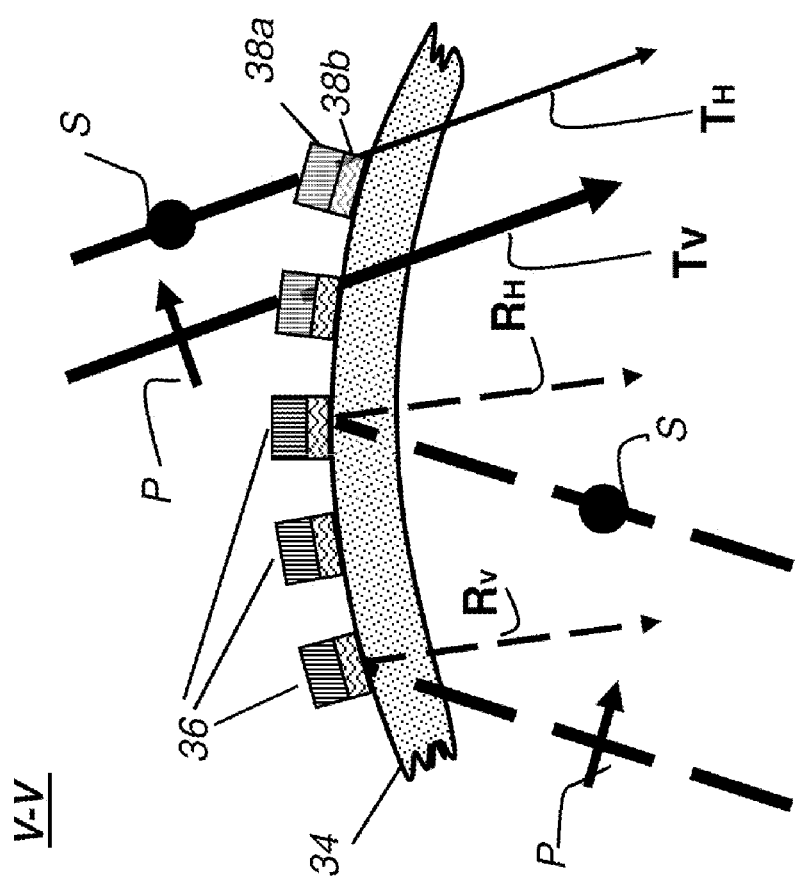
FIG. 5C shows a vertical cross sectional view of a double stack wire grid according to one embodiment, formed on a curved substrate with the transmitted and reflected light shown.

Elongated structures 36 (FIG. 2) can alternately be formed from a combination of materials, wherein at least one of the materials has a complex index of refraction, as defined earlier. Referring to the reference coordinates in FIG. 5A and the cross sections of FIGS. 5B, 5C, 5D and 5E, various embodiments using elongated structures 36 are shown. Substrate 34 in FIGS. 5B through 5E is a curved substrate according to a main aspect of this invention. FIG. 5B shows an embodiment in which elongated structures 36 are formed from a single material, such as aluminum or other metal. FIG. 5C shows an alternate embodiment in which each elongated structure 36 is formed as a composite, with stacked layers 38a and 38b of different materials. In one embodiment, for example, layer 38a is aluminum and layer 38b is carbon. The carbon layer 38b absorbs incident light, making it particularly advantageous for reducing back-reflection.

FIGS. 5B and 5C show a number of values, as follows:

$T_V$ is the transmission value of the vertically polarized light which is designed to be the largest of the transmission values shown, depending on the desired optical density of the eyeglass lens.

$T_H$ is the transmission for the light polarized in the horizontal direction, which is designed to be as low as possible for glare reduction.

$R_H$ and $R_V$ are the values for undesirable reflected light that is incident from the viewer side, polarized in the horizontal and vertical directions correspondingly. These reflections should be minimized.

Figure 5E:
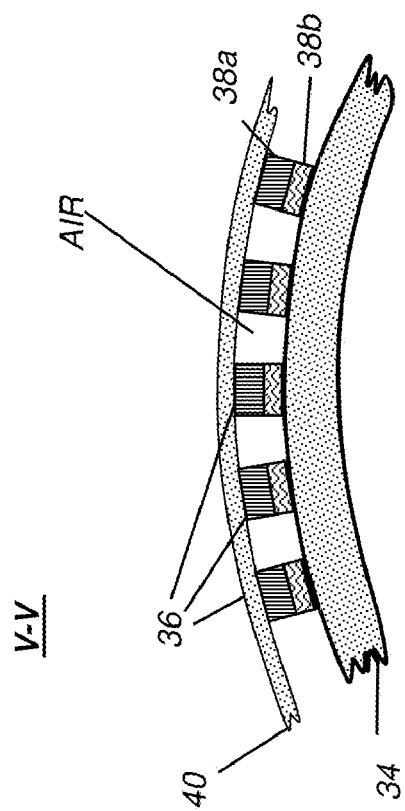
FIG. 5E is a cross sectional view of a wire grid polarizer protected with a cover film with air trapped between the elongated structures according to another embodiment of the present invention.
Figure 5D:
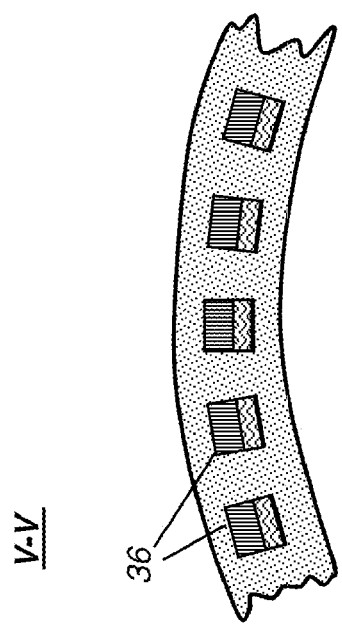
FIG. 5D shows a vertical cross sectional view of an embedded wire grid polarizer

In order to prevent contamination from dirt, fingerprints, airborne particles, and other sources, elongated structures 36 can be coated, embedded, encased, or otherwise shielded from exposure. In one embodiment, as shown in FIG. 5D, a coating of an optical polymer such as PMMA is used to fully encase elongated structures 36. This fills interstitial spaces, the gaps between elongated structures 36. In an alternate embodiment, as shown in FIG. 5E, elongated structures 36 are sandwiched between lens surfaces, but without interstitial material. In the FIG. 5E embodiment, a transparent layer 40 is provided for covering elongated structures 36. Air or other gas, or a very low index material such as an aerogel, fills the spaces between elongated structures 36. This arrangement is advantaged because it allows a larger pitch between elongated structures 36, due to the low index of refraction of air. This allows for easier fabrication of elongated structures 36.

Figure 5F:
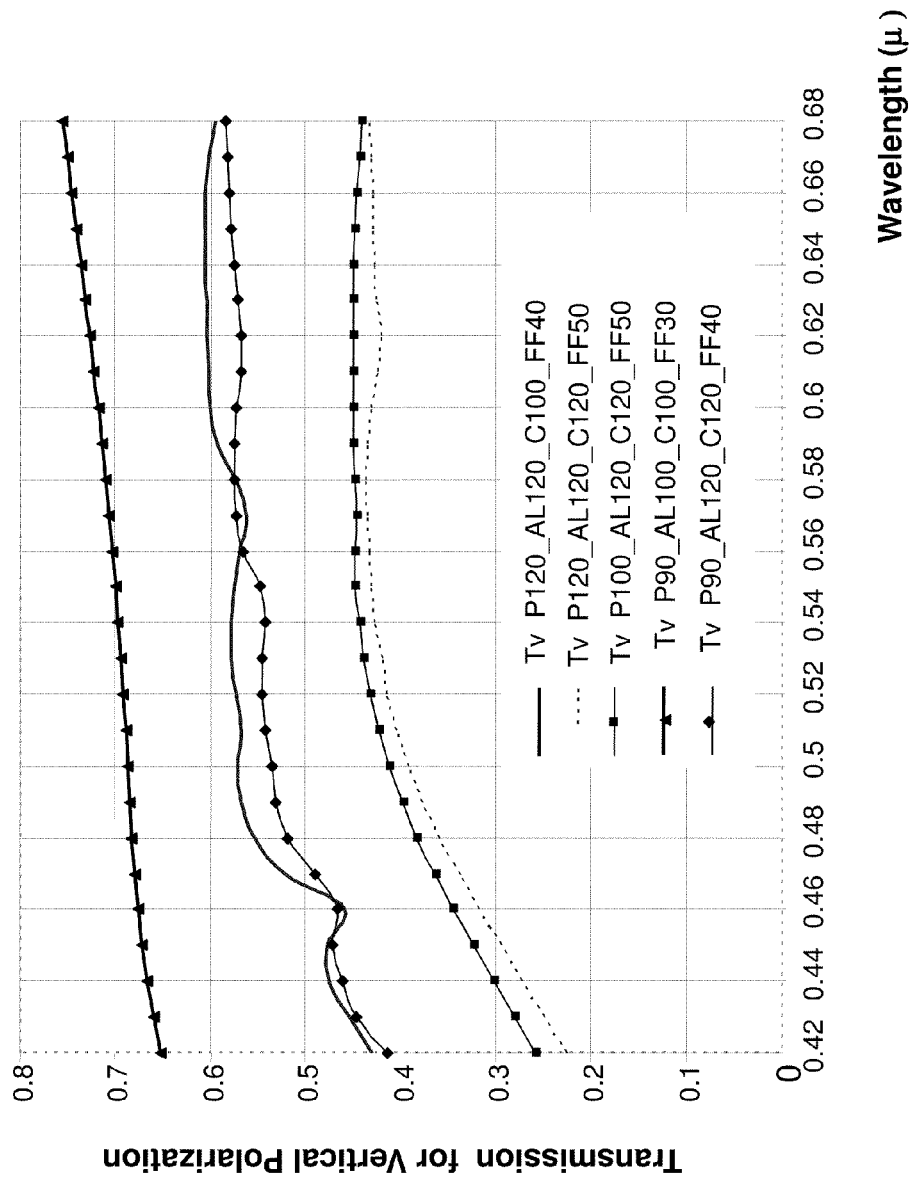
FIG. 5F is a graph that relates transmission for vertically polarized light to wavelength for an embodiment having the arrangement of FIG. 5C.
Figure 5G:
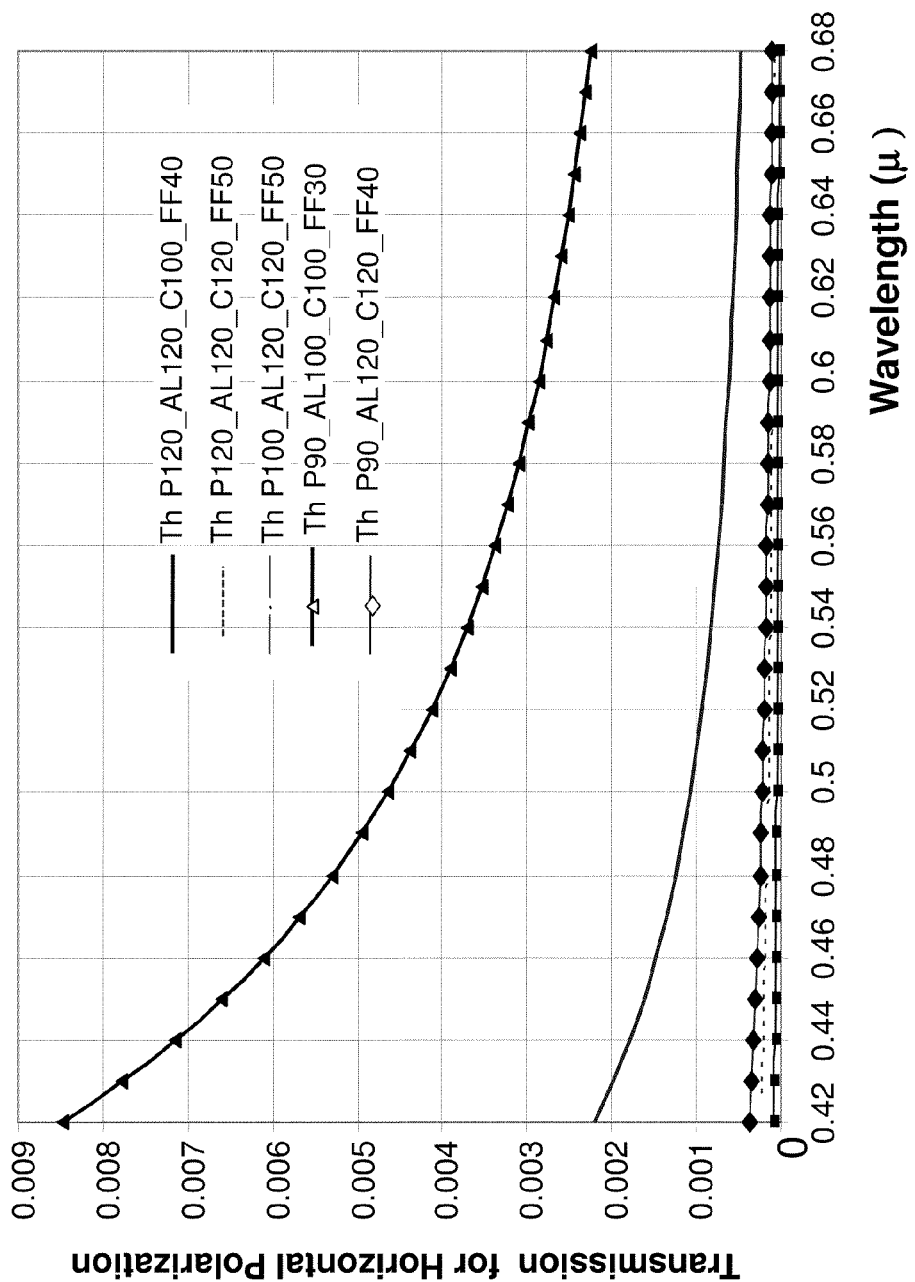
FIG. 5G is a graph that relates transmission for horizontally polarized light to wavelength for an embodiment having the arrangement of FIG. 5C.
Figure 5H:
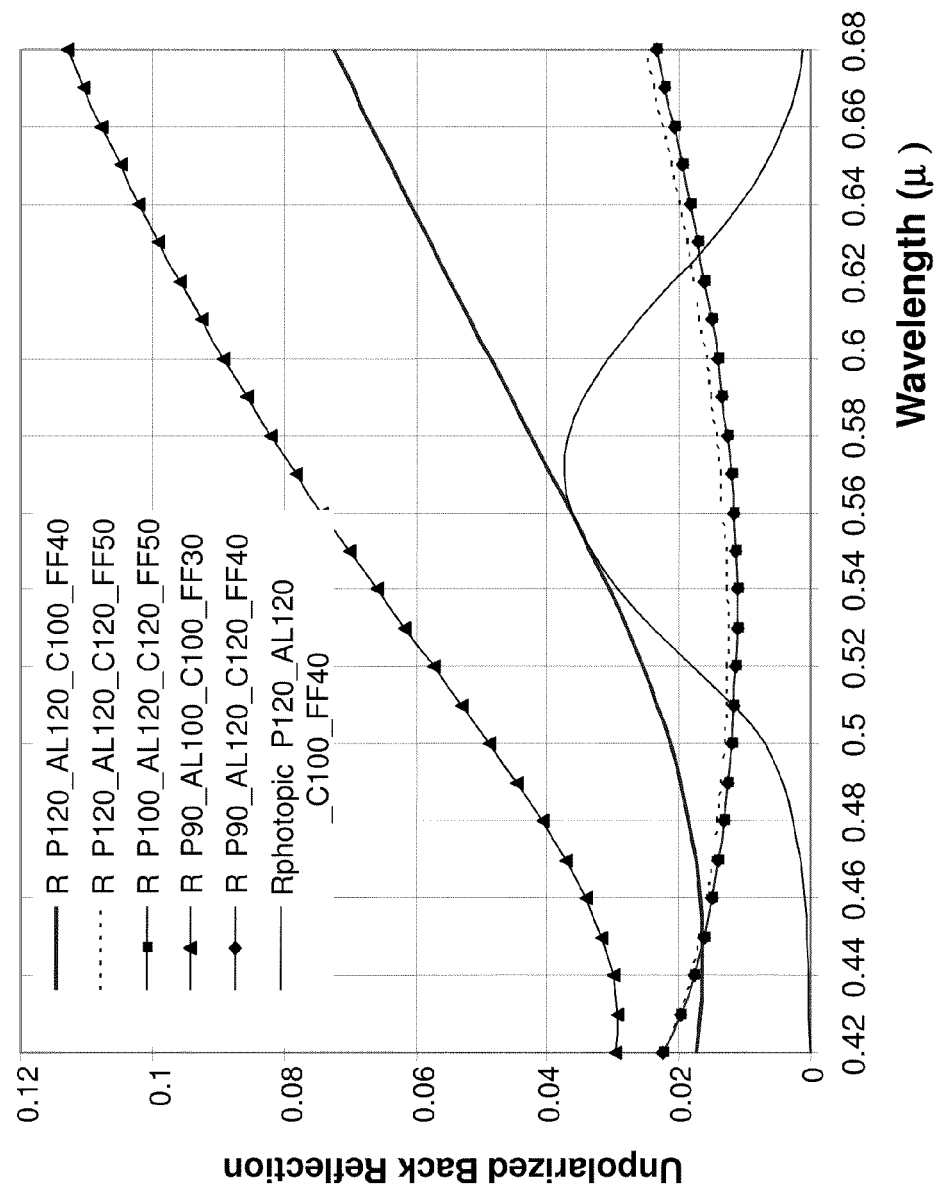
FIG. 5H is a graph that relates unpolarized back reflection to wavelength for an embodiment having the arrangement of FIG. 5C.

The performance of the polarizer depends on the choice of parameters such as layer thicknesses, pitch of the elongated structures, choice of materials, and the fill factor, namely the ratio of the width of the elongated structures to the pitch. Using different parameters allows the polarizer to have different spectral transmission curves, different visual transmission characteristics, and different polarization extinction ratios. FIG. 5F shows the performance of different polarization configurations in terms of transmission of the vertical polarization for the embedded polarizer of FIG. 5D. The substrate and the embedding material is CR-39 and the stack is an aluminum-carbon stack. The 5 curves in FIG. 5F show the transmission for $T_V$ over a range of visible wavelengths for different layer structures as derived using a commercially available rigorous diffraction grating analysis program. Each of the configurations is designated by the pitch (P) in nm, the thickness of the aluminum layer (AL) in nm, the thickness of the carbon layer (C) in nm and the fill factor (FF). Thus, as an example, the designation P90_AL_120_C_100_FF40 means pitch of 90 nm, aluminum thickness of 120 nm, carbon thickness of 100 nm and fill factor (or duty factor) of 40%. The designation P120_AL100_C100_FF40 has a pitch of 120 nm, aluminum thickness of 100 nm, carbon thickness of 100 nm, and fill factor of 40%. The graph of FIG. 5G shows corresponding transmission for unwanted $T_H$ for an embodiment with the arrangement of FIG. 5D with different design parameters of polarizers made of carbon and aluminum stack embedded in CR-39 plastic. The graph of FIG. 5H shows the performance of the polarizers in terms of their ability to block unwanted back reflections. FIG. 5H shows unpolarized back reflection over a range of visible wavelengths using the embodiment of FIG. 5D with different design parameters of polarizers made of carbon and aluminum stack embedded in CR-39 plastic. Only one number is used which is the summation of the reflection in both the horizontal and vertical direction. The Rphotopic curve shows reflection weighting according to the photopic response of the eye.

Other embodiments of the present invention employ more complex layered arrangements and a variety of different materials. As just one example, a layered arrangement with two or more alternating elongated metal and dielectric layers can be deposited to form wire grid polarizer 30, with an arrangement such as that described in U.S. Pat. No. 6,788,461 entitled "Wire Grid Polarizer" to Kurtz et al.

Embodiments of the present invention that use aligned particulates deposited on substrate 34 to form elongated structures 36 offer a number of advantages, particularly with respect to weight and ease of fabrication. Referring back to the discussion of structure dimensions relative to FIG. 2, elongated and axially aligned particles, such as silver and copper particles, can also be arranged with a suitable pitch p, thickness t, and width w for providing the appropriate polarization.

Figure 6:
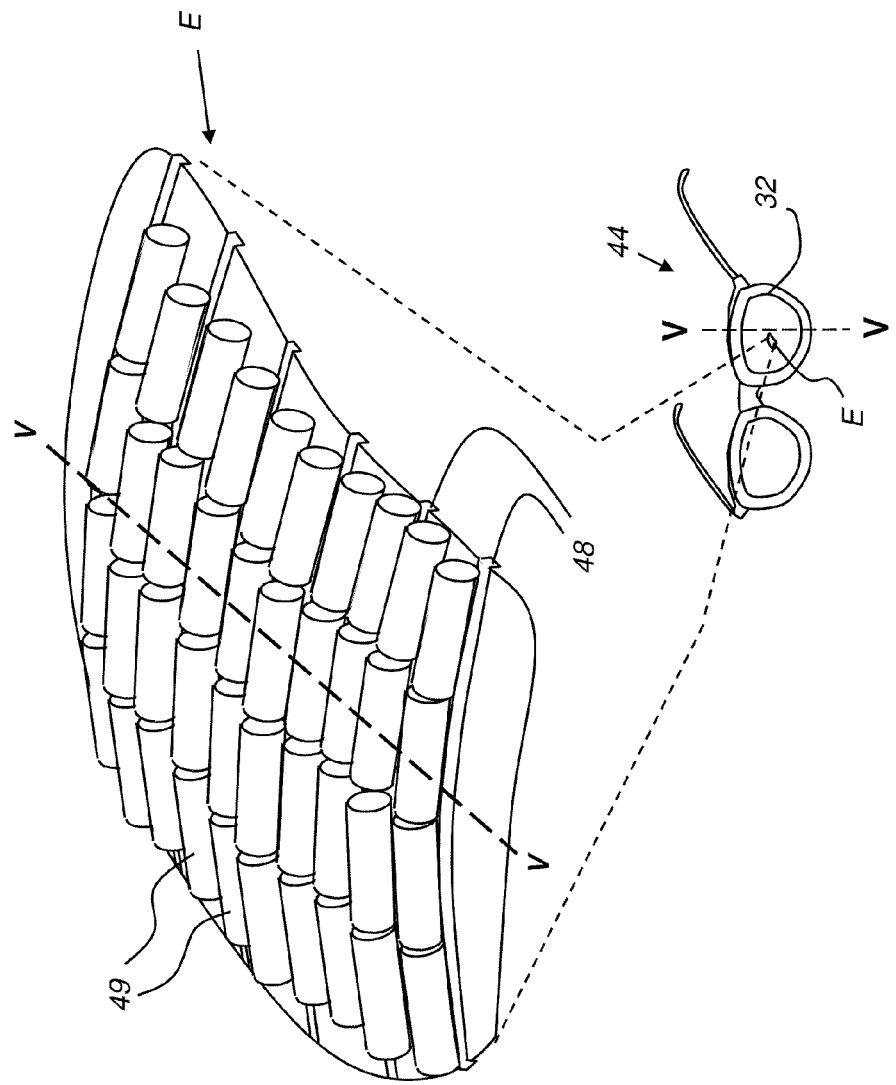
FIG. 6 is a partially enlarged, perspective view of another embodiment where the polarizer is made of nanotubes made of complex index materials and aligned on a curved grooved substrate.

Referring to FIG. 6, an alternate embodiment of the present invention uses a polarizer that is fabricated using elongated structures that are formed by depositing an arrangement of elongated nano-particles 49, aligned along alignment grooves 48 on lens substrate 32, as shown over enlarged area E in FIG. 6. Alignment grooves 48 or, alternately, protrusions (not shown), can have a pitch dimension that is substantially larger than the wavelength of light, simplifying fabrication. Elongated nano-particles 49, formed of a material having a complex index of refraction, are aligned to the grooves 48 and also are self-aligned to each other. In one embodiment, elongated nano-particles 49 are Carbon Nano Tubes (CNT), and materials having similar refractive index properties could also be used. Alignment grooves 48 are formed to be generally perpendicular to the vertical direction V shown.

Fabrication Methods

Figure 7C:
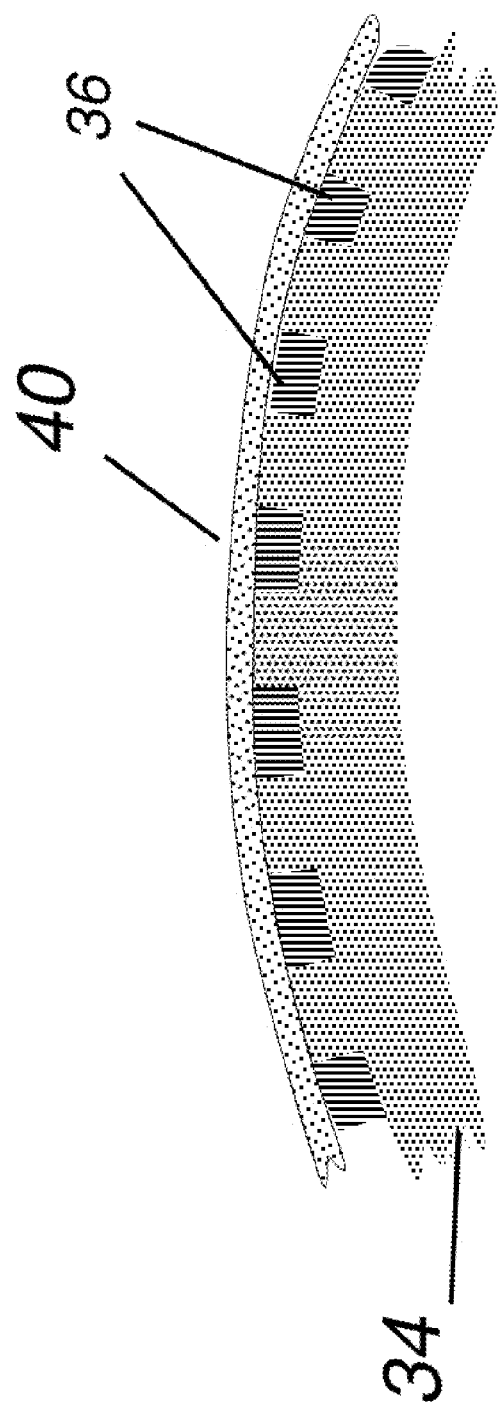

In one embodiment, elongated structures 36 are formed by nano-printing onto the lens surface. Alternately, elongated structures 36 can be formed by molding or micromachining as shown in the sequence of cross-sectional side views in the vertical direction in FIGS. 7A, 7B, and 7C. In this embodiment, channels 42 are formed in the surface of a lens 31, formed of substrate 34 using a stamping tool or mold 45, as shown in FIG. 7A. Channels 42 are then filled with a material having a complex refractive index, as shown in FIG. 7B, thereby forming elongated structures 36. In one embodiment, solvent-coating is used as the filling process. Alternately, vacuum deposition is used, employing shade masking, a method familiar to those skilled in the microlithographic fabrication arts. In an embodiment using nanotubes or other particulate materials, as was described earlier with reference to FIG. 6, the materials are aligned within alignment grooves 48 during the filling or coating process. As shown in FIG. 7C, a coating or film layer 40 is optionally applied in order to protect the outer surface of the array of elongated structures 36.

Advantageously, the wire grid structure of the present invention can be formed onto lens substrate 34 either before or after the lens is shaped. The wire grid structure can also be deposited by being applied adhesively or otherwise bonded to the lens surface before or after being shaped. Elongated features 36 can be formed on the outer (convex) surface of the eyeglass lens or on the inner (generally concave) surface.

Figure 8:
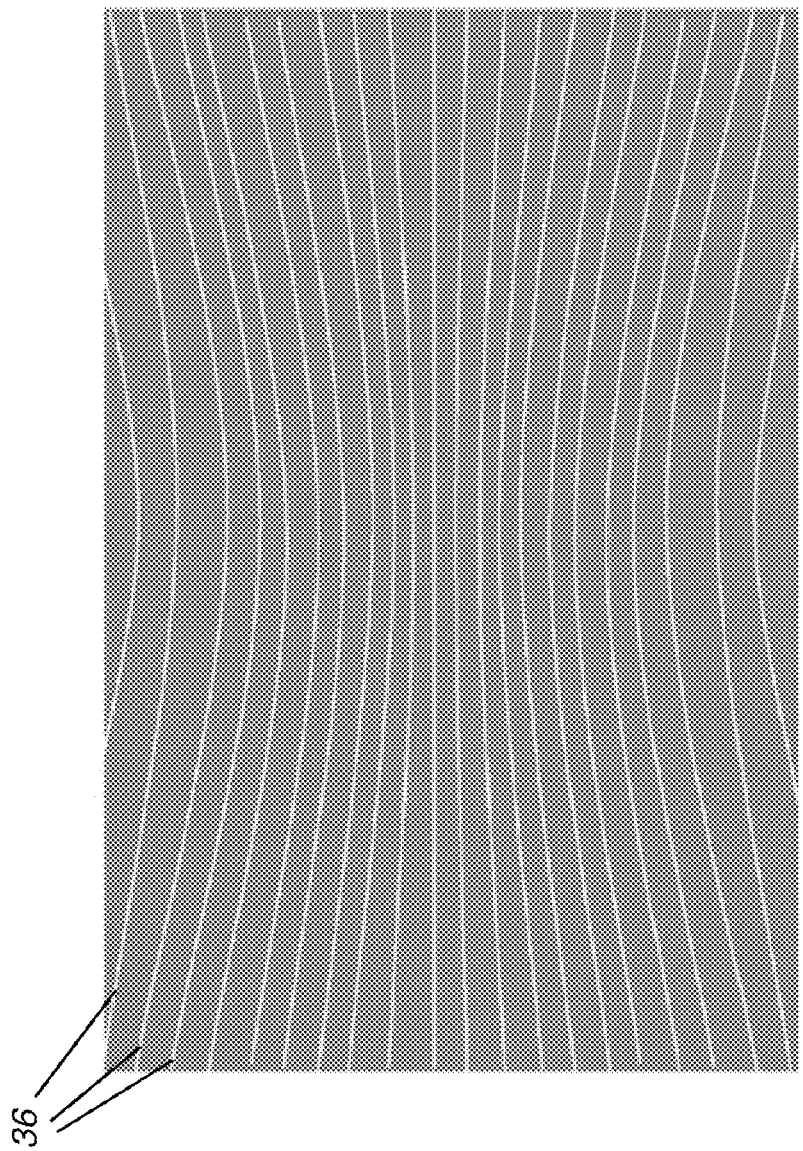
FIG. 8 shows a pattern of elongated structures used to compensate for bending of the lens surface in one embodiment.

In one embodiment, as shown in the plan view of FIG. 8, the array of elongated structures 36 is itself formed in a pattern that corrects or compensates for the anticipated bending and shaping of the lens substrate. Then, when substrate 34 is formed into its curved shape, each line of elongated structures 36 aligns to have the desired horizontal or other orientation. The arrangement of FIG. 8 can be formed onto substrate 34 itself or onto a laminate layer that is bonded to substrate 34 during some stage of eyewear fabrication.

Figure 9B:
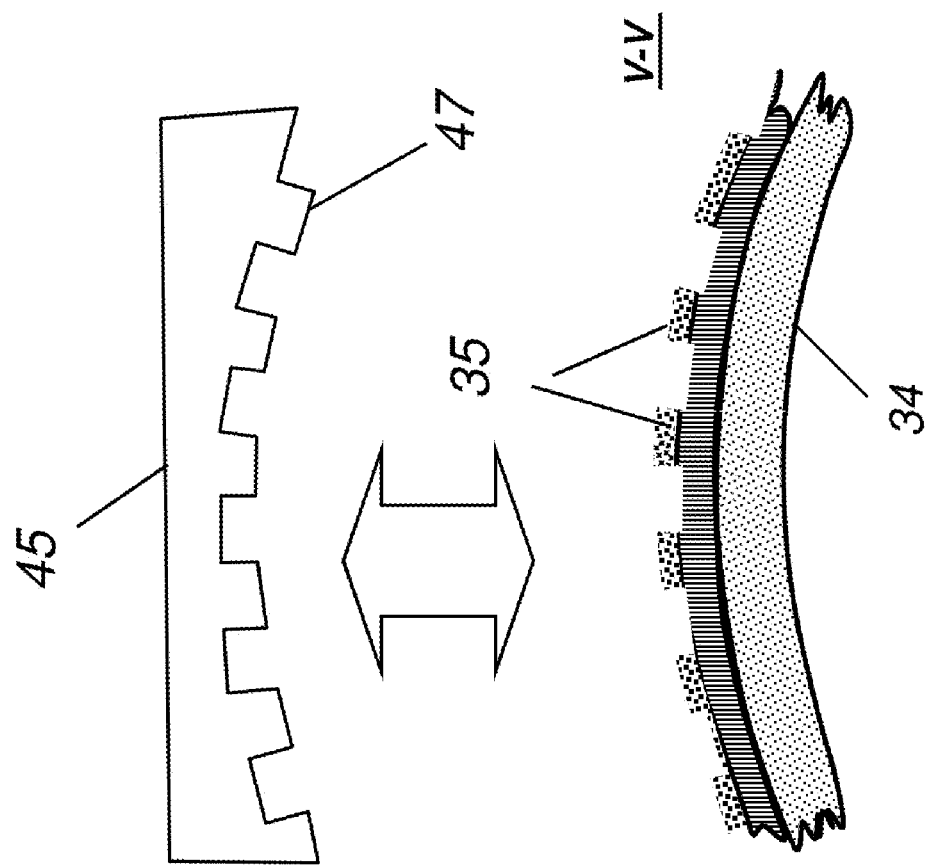

In another embodiment, as shown in FIGS. 9A, 9B, and 9C, substrate 34 itself is first pre-coated with layer 33 which can be aluminum, carbon, or other material having a complex index of refraction. Layer 33 is then coated with a polymer or monomer layer 43. A stamping tool or mold 45 having microstructures 47 is used to remove a pattern of layer 43 material and thus impart elongated structures 35 onto the surface of substrate 34 as shown in FIG. 9B. An etching process is then used to form elongated structures 36 of the complex index material as shown in FIG. 9C. The polymer is a low viscosity photoresist material that is then cross-linked after stamping to improve the hardness of the material prior to etching.

Figure 10B:
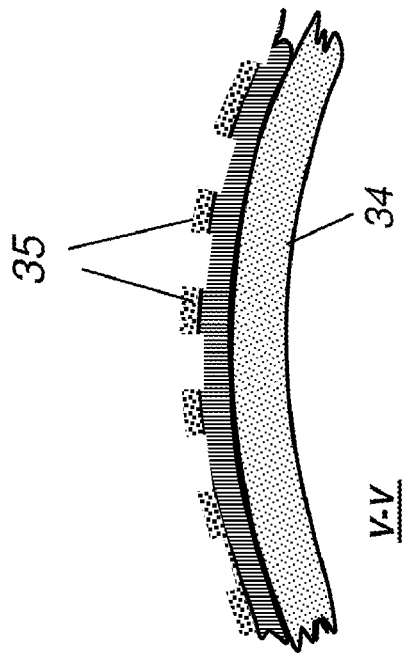
Figure 10A:
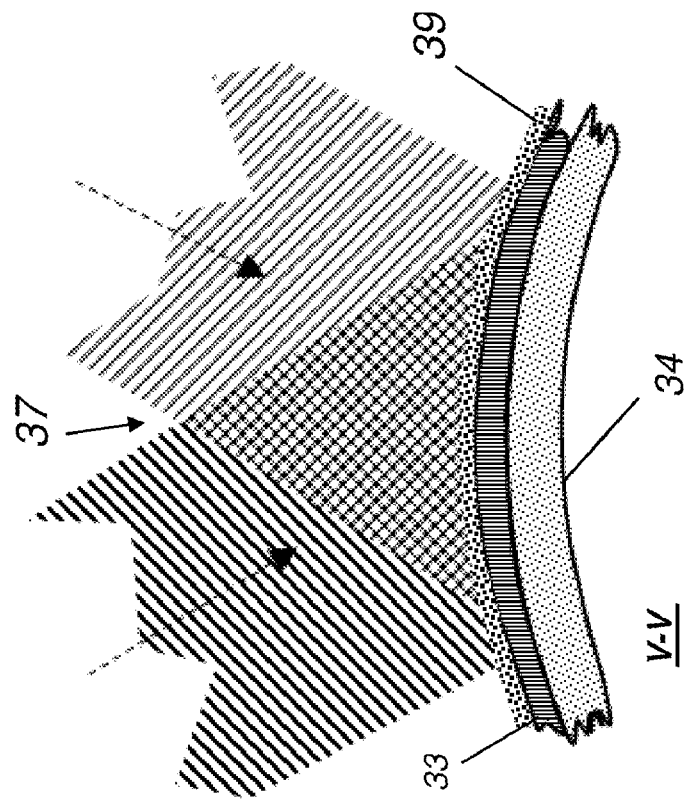

In yet another embodiment, as shown in FIGS. 10A, 10B, and 10C, an etching process is used to form the array of elongated structures 36 directly onto the curved glass or plastic lens surface. The basic steps of this process include the following:

1) Deposit an initial coating. One or more thin layers 33 of material having a complex index of refraction are coated or otherwise deposited onto the lens substrate 34. In one embodiment, a single material, aluminum, is used. In another embodiment, multiple layers are deposited, with the first layer that is deposited being carbon or other highly light-absorbent material for reducing back-reflection, as described earlier with reference to FIG. 5C.
2) Deposit a photoresist layer 39 onto the initial coating. This material can be a conventional photoresist material used for photolithographic etching, for example.
3) Expose a pattern for the array of elongated structures 36 into the photoresist material. This pattern can be from a mask or using interference 37 from two lasers as shown in FIG. 10A, or by scanned light beam or suitable projection optics such as one using Talbot imaging or holographic imaging. Exposure can be from UV, excimer lasers, or other short wavelength radiation.
4) Develop the photoresist and prepare the exposed surface for etching as shown in FIG. 10B.
5) Apply etching material and perform the etching process to form the elongated structures 36 as shown in FIG. 10C.

Multi-zone Polarizer

Unlike conventional methods for forming polarizing films by stretching, the fabrication methods for the wire grid polarizer of the present invention not only allow the polarizer to be formed onto a curved glass or plastic surface, such as using the etching procedure just described, but also allow a large measure of control over polarization axes at different positions along the lens surface. The earlier discussion relative to FIG. 1 indicated that the preferred orientation of polarization transmission is vertical, blocking horizontally polarized light. While this is the case for many conventional sunglass applications, there can be applications for which it is advantageous to have different polarization zones within the same lens surface.

Figure 11:
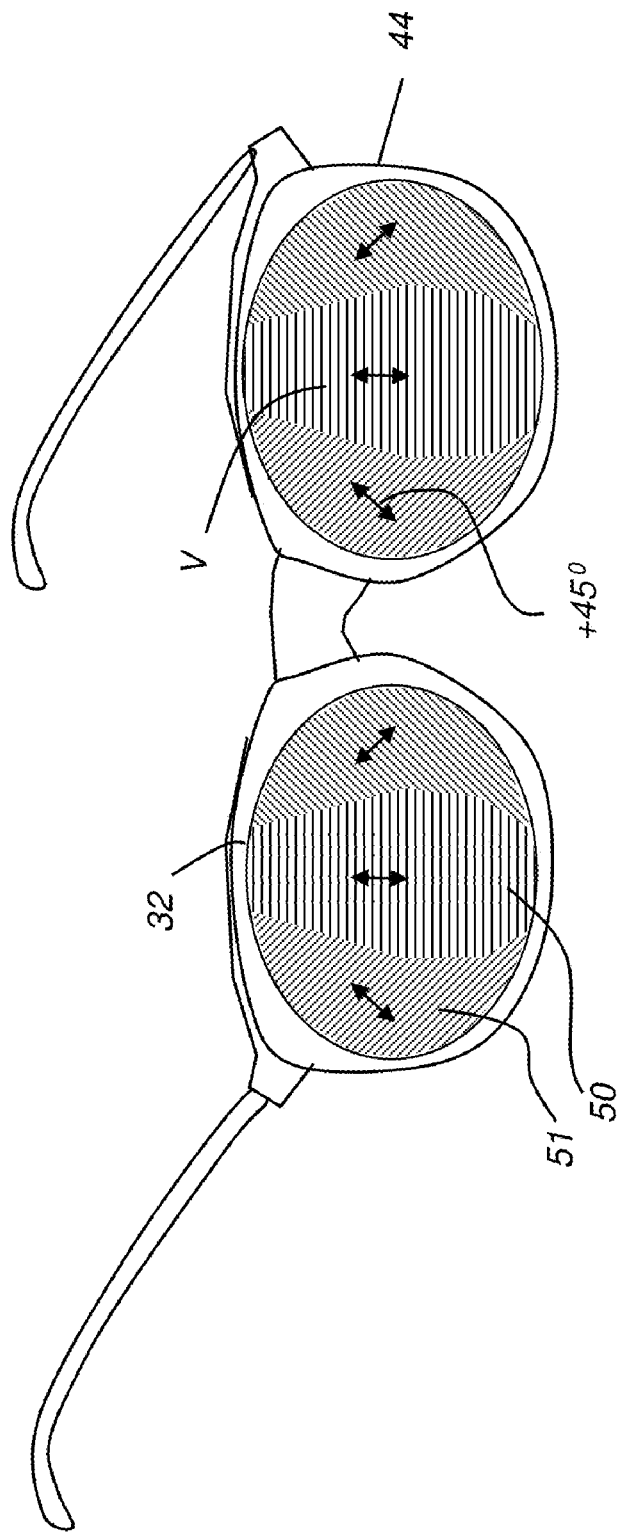
FIG. 11 is a plan view of polarized eyeglasses having a plurality of different polarization transmission axes.

Referring to FIG. 11, there is shown an arrangement of eyewear 44 that takes advantage of the capability for zoned polarization afforded by the present invention. For each lens, an area about the center of the field of view 50 has a horizontal polarization axis. However, moving toward each outer edge of the lens 32, to zone 51 the polarization axis is shifted from horizontal. This arrangement can have benefits for polarized eyewear in specialized applications, such as for flight equipment or where the source of reflected glare is not from a horizontally disposed reflective surface, for example.

The apparatus and methods of the present invention can provide polarized eyewear that maintains a desired transmission axis of polarization at any point along the lens. The exceptional degree of control over polarization that is afforded by wire grid polarizers helps to yield more precise and efficient polarizing filters and allows the design of "wrap-around" surfaces having a high degree of curvature. The polarizer of the present invention does not introduce aberrations or distortion and can be used with conventional sunglasses, prescription eyeglasses, contact lenses, goggles and protective eye- or face-shields, windshields and protective glass in cockpits, and other eyeglass apparatus. Because it can be produced to provide polarization to a high degree of accuracy, the polarized eyewear of the present invention can be fabricated with less waste than is generated when manufacturing conventional polarized eyeglass materials.

The polarizer of the present invention can be used in combination with other non-polarizing layers, including those containing dyes or pigments.

Polarized eyeglasses formed according to the present invention can be designed to tune reflection suitably for light of different wavelengths. This capability can help, for example, to reduce the level of infrared or heat radiation that is transmitted through the lens. As has been noted, changes to the structure of elongated structures 36 can also help to reduce the effects of reflected light received from behind the lens.

It is also well understood that the polarizer eyewear according to this invention can be used with or combined with common vision correction glasses. Thus substrate 34 of the polarizing lens could be a vision correction lens. Any of a number of different materials could be employed for lens 32, including photochromic or transitional materials, or for elongated structures 36. Any of a number of methods could be used for depositing one or more materials having a complex index of refraction onto lens substrate 34.

Broadly understood, photochromism or photochromatism is a reversible transformation of the opacity or apparent color of a material that occurs in the presence of electromagnetic energy. In conventional parlance, the term "photochromic" is most often used in relation to light-responsive photochromic materials that change opacity or color in the presence of ultraviolet (UV) light. In the context of the present disclosure, however, the broader definition of photochromism applies, wherein the electromagnetic stimulus energy is not necessarily light, but can be any of a number of other types of energy.

In the context of the present disclosure, photochromic or photochromatic materials are broadly defined as materials that undergo a temporary, reversible change in opacity, and optionally in color, in response to received stimulus energy. When the stimulus energy is removed or is decreased or inverted, the opacity change reverses. For many types of photochromic materials, the stimulus energy is incident light. For one class or type of photochromic materials, electrochromic or electro-photochromic materials such as liquid crystal materials, the stimulus energy is an applied voltage bias.

The term "transitional lens" or, alternately, transitional optics, refers to eyeglasses or other eyewear that changes opacity over a variable, substantially continuous range and is often applied to light-responsive photochromic eyewear, for example.

Embodiments of the present invention expand upon the capabilities of wire grid polarizers to add light-responsive photochromic and electro-photochromic response to polarized eyewear using wire-grid polarizers, useful in a number of consumer, entertainment, commercial, industrial, and defense applications.

As has been noted, many types of photochromic materials change their opacity or color in response to incident light energy. Photochromic sunglasses, for example, become increasingly opaque (darker) upon exposure to increasing levels of sunlight. Conventional light-responsive photochromic lenses darken on exposure to UV or other photonic radiation. Once the radiation is removed (for example, by bringing the lenses indoors), the lenses gradually return to their clear state. Light-responsive photochromic lenses can be made of many different materials including glass, plastic or polycarbonate resins. There are many types of photochromic molecules in various classes, including: triarylmethanes, stilbenes, azastilbenes, nitrones, fulgides, spiropyrans, naphthopyrans, spiro-oxazines, quinones and others.

Versions of these lenses on glass substrates are typically treated for photochromic properties by embedding microcrystalline silver halides (such as silver chloride), within the glass. Plastic and resin photochromic lenses rely on organic photochromic molecules such as oxazines and naphthopyrans to achieve reversible opacity. These lenses typically darken in sunlight, but not under artificial light, since these photochromic dyes are UV (ultraviolet) light sensitive. More recently, new dyes have been developed to allow the lenses to darken in response to visible light.

When light-responsive photochromic materials are embedded within a glass substrate, the amount of darkening or density is dependent on the thickness of the glass. This poses problems with variable thickness lenses in prescription eyeglasses. With plastic and resin lenses, the photochromic material is typically embedded into the surface layer of the plastic in a uniform thickness of up to 150 μm so that photochromic response is more uniform.

One problem with conventional photochromic lens design relates to slow response time. When exposed to UV light, the typical light-responsive photochromic lens becomes increasingly opaque over a period of approximately fifteen minutes, with the bulk of the transformation occurring within less than one minute. The lenses revert and become less opaque with similar timing, returning to a clear state at a rapid initial rate, then more slowly over a period of several minutes.

One factor in photochromic response time is temperature-dependency. Because light-responsive photochromic compounds fade back to a clear state by a thermal process, the higher the temperature, the less density the photochromic lenses will express. This characteristic prevents these devices from achieving near-total density at high temperatures. Conversely, photochromic lenses turn very dark in cold temperatures. For this reason, conventional photochromic lenses have been limited to eyewear and to devices where the transformation from dark to light is restricted to a narrow range.

Another factor in photochromic switching speed in general relates to relative rigidity of the surrounding materials in which the photochromic material is embedded. For many photochromic materials, the opacity change is the result of a change in molecular shape or position. Thus, when embedded within a glass or conventional rigid polymer lens materials, photochromic materials tend to change shape and position more slowly than when in solution. Recently it has been discovered that by attaching more flexible, low Tg polymers (for example siloxanes or poly (butyl acrylate)) to light-responsive photochromic dyes, the dyes are able to switch much more rapidly than in a rigid lens or structure. Some combinations including spirooxazines with siloxane attached polymers switch at near solution-like speeds, even when contained in a rigid matrix.

Electrochromic materials vary their opacity or color as a varying voltage bias is applied. Familiar types of electrochromic materials include liquid crystals used in various types of displays. When the opacity variation is effectively only between one of two states, that is, either transmissive or blocked (fully opaque), the term "shutter" is used to describe this behavior and eyeglasses that operate in this way.

Hybrid solutions that exhibit both light-responsive photochromic and electrochromic behavior, along with photovoltaic response, have also been identified. For example, in 1998, researchers Robert Kostecki and Frank McLarnon of Berkeley Lab's Environmental Energy Technologies Division formed an electrode consisting of thin transparent films of nickel hydroxide [$Ni(OH)_2$] and titanium dioxide [$TiO_2$] layered on glass and found that the combination has potential use as either a light-responsive photochromic device or an electrochromic device, or both. Electrochemical reactions from UV light produce photochromic behavior. When light strikes the titanium-nickel sandwich, electrons from the $Ni(OH)_2$ layer flow to the $TiO_2$ film and initiate electrochromic behavior. The $NiII(OH)_2$ oxidizes into a form of higher nickel (NiIII and NiIV) oxides. As it does this, what was a transparent film gradually darkens into shades of gray and black. When light is blocked, this reaction then reverses itself. Full coloration of a prototype device of this type, from transparency to its darkest state, required about 10 minutes. Applications for light-responsive display panels and "smart windows" using this technology have been proposed.

Embodiments of the present invention employ light-responsive photochromic and electrochromic materials together with wire-grid polarized optics in order to provide a number of improved optical devices that respond to incident light and other conditions. The combination of these materials with wire grid designs allows improvements in response times for light-responsive photochromic and electrochromic materials used in eyewear, for example. This combination also provides the benefits of both variable opacity and reduced reflections typical of polarized eyewear in general. In addition, this combination presents a number of new capabilities for eyewear applications, such as in industry and defense applications, for example.

Figure 12A:
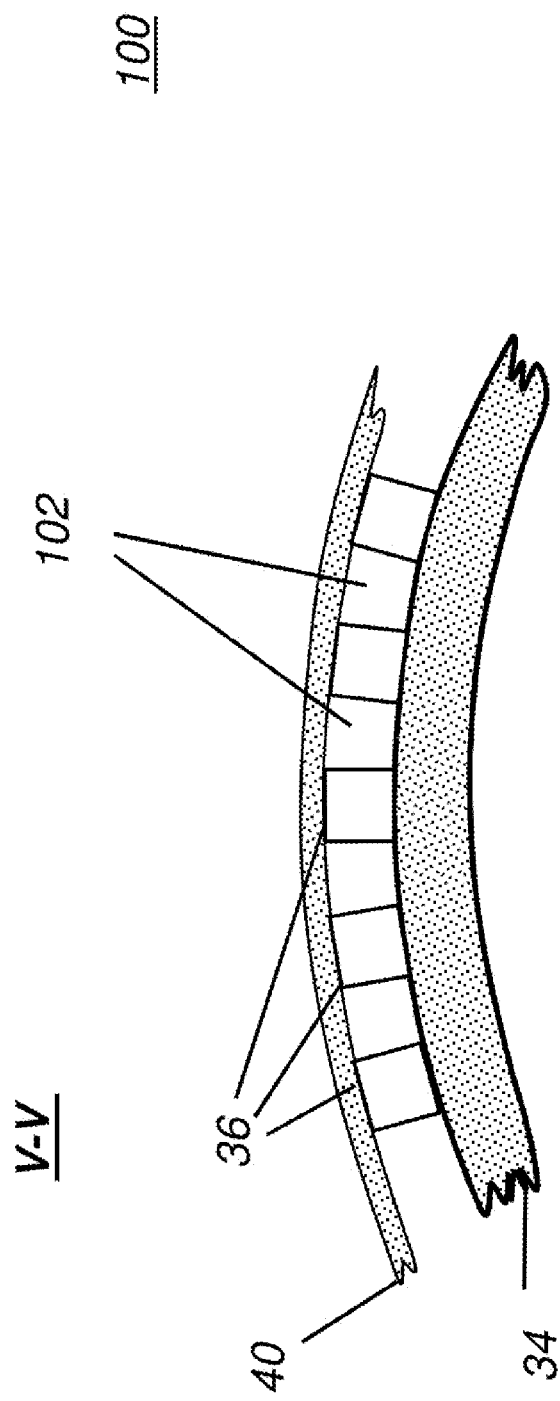
FIG. 12A is a side view showing polarized eyeglasses having an interstitial photochromic material deposited between elongated structures that form a wire grid polarizer.

The partial cross-sectional view of FIG. 12A shows an article of polarized eyewear 100 that has elongated structures 36 that form a wire grid polarizer on a curved surface, as described previously. An interstitial photochromic material 102 is deposited in the spaces between and along the length direction of elongated structures 36. Layer 40 seals these interstitial regions, thus allowing the use of a fluid or liquid photochromic material. This sealed arrangement allows a photochromic dye to be in suspension. In this fluid form, the photochromic material is able to change its molecular shape and position more freely than with conventional eyewear solutions in which the photochromic material is embedded within a rigid substrate. This capability allows the photochromic response to occur more rapidly and can allow the use of photochromic materials that are less costly than those conventionally used.

Figure 12B:
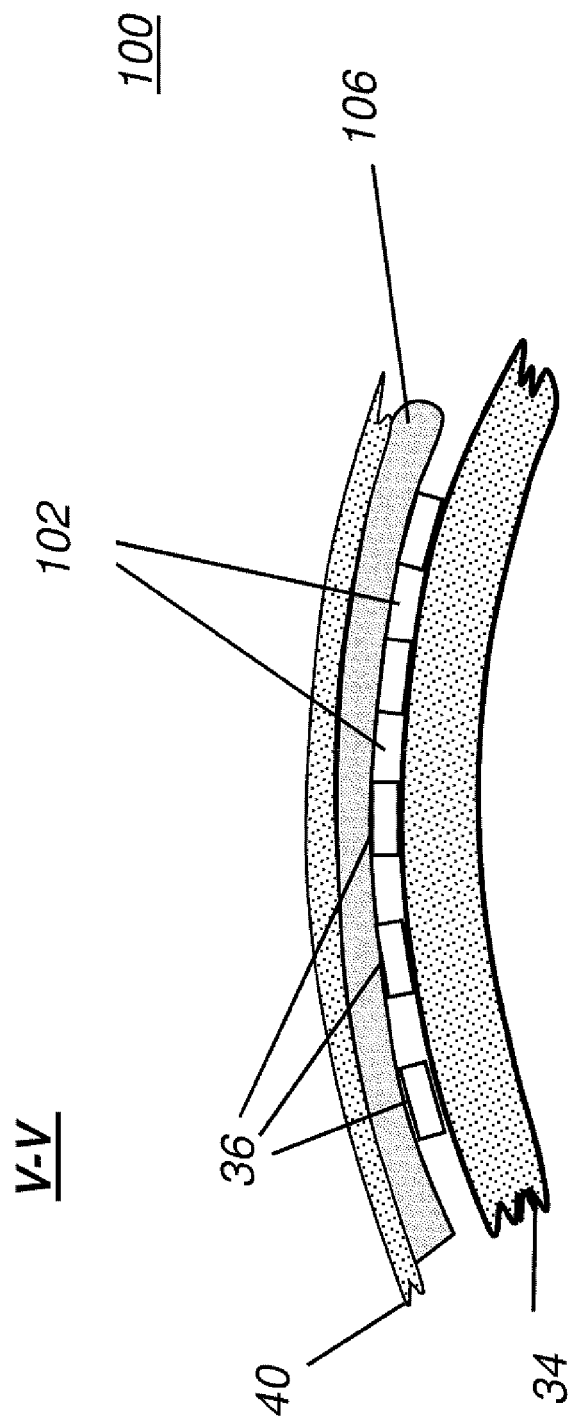
FIG. 12B is a side view showing polarized eyeglasses having an interstitial photochromic material deposited between elongated structures that form a wire grid polarizer and using a transparent gel.

The side view of FIG. 12B shows an alternate embodiment using a transparent insulator 106, such as a gel, an aerogel, or similar substance layered over photochromic material 102 and elongated structures 36. Alternately, photochromic material can be embedded within a glass or plastic material.

Figure 12C:
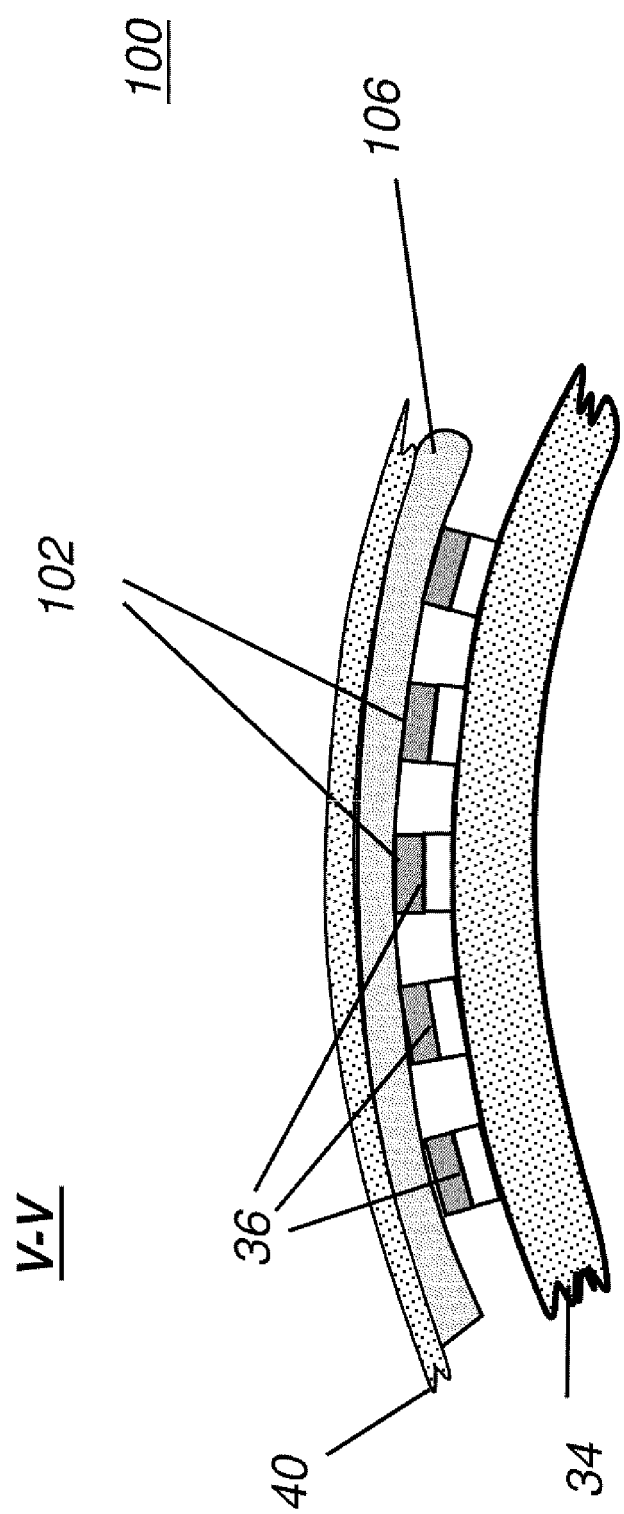
FIG. 12C is a side view showing polarized eyeglasses having a photochromic material deposited onto elongated structures that form a wire grid polarizer and using a transparent gel.

The side view of FIG. 12C shows an alternate embodiment with photochromic material 102 formed onto elongated structures 36. A laminate or other hard coating provides a sealant layer 40 over an insulator 106.

Figure 12D:
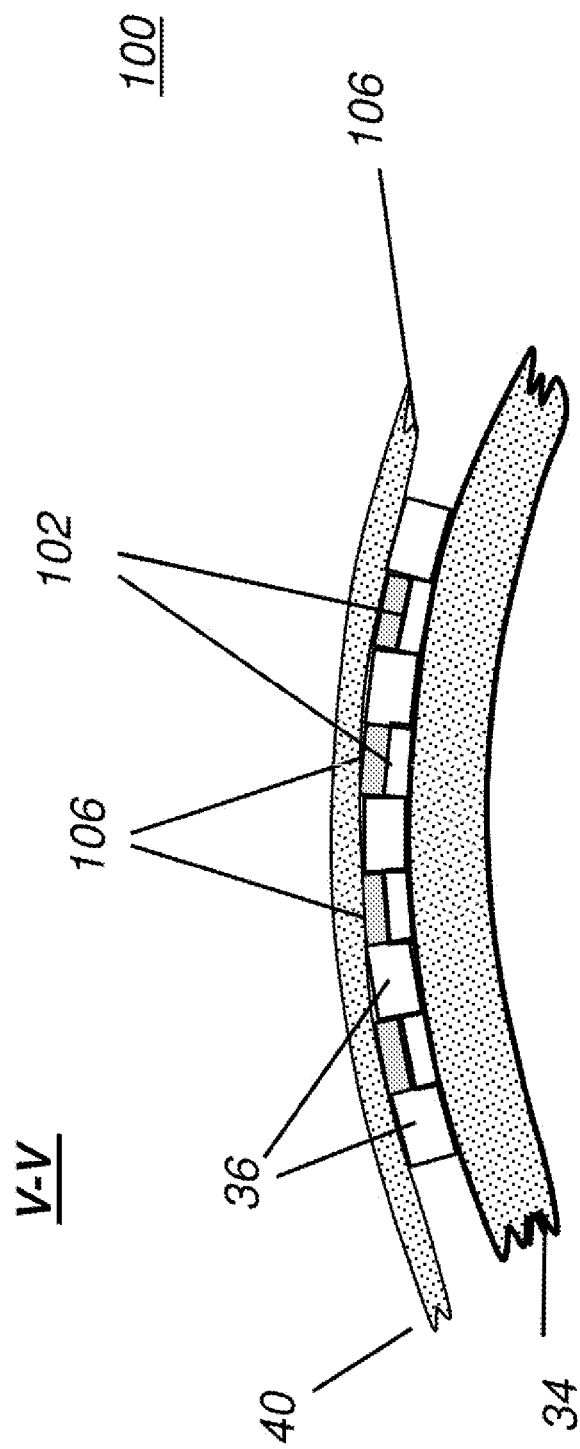
FIG. 12D is a side view showing polarized eyeglasses having an interstitial photochromic material deposited between elongated structures that form a wire grid polarizer and using a transparent gel in each interstitial region.

The side view of FIG. 12D shows an alternate embodiment with photochromic material 102 formed onto elongated structures 36. A laminate or other hard coating provides a sealant layer 40.

Figure 12E:
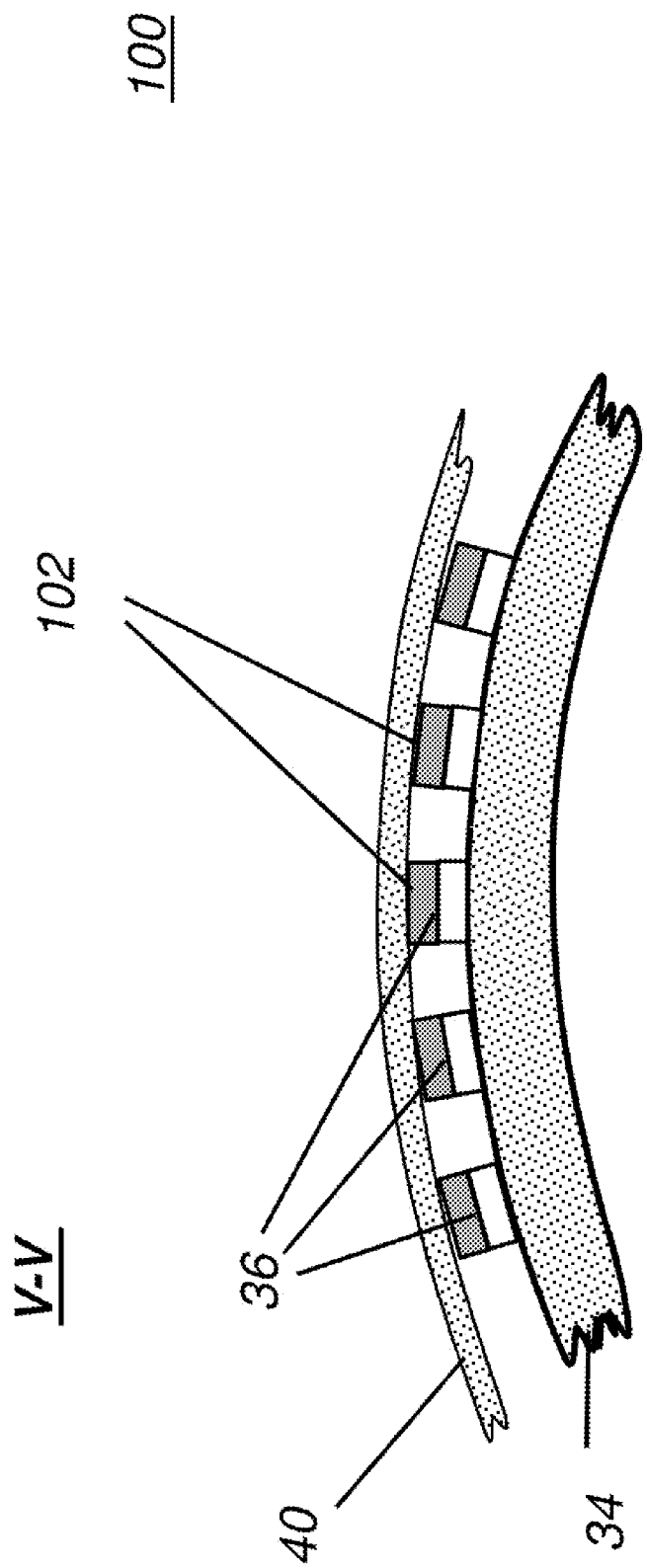
FIG. 12E is a side view showing polarized eyeglasses having a photochromic material deposited onto elongated structures that form a wire grid polarizer and using a sealant layer.

The side view of FIG. 12E shows an alternate embodiment with photochromic material 102 formed onto elongated structures 36. A laminate or other hard coating provides a sealant layer 40. No insulator layer is used.

Figure 12F:
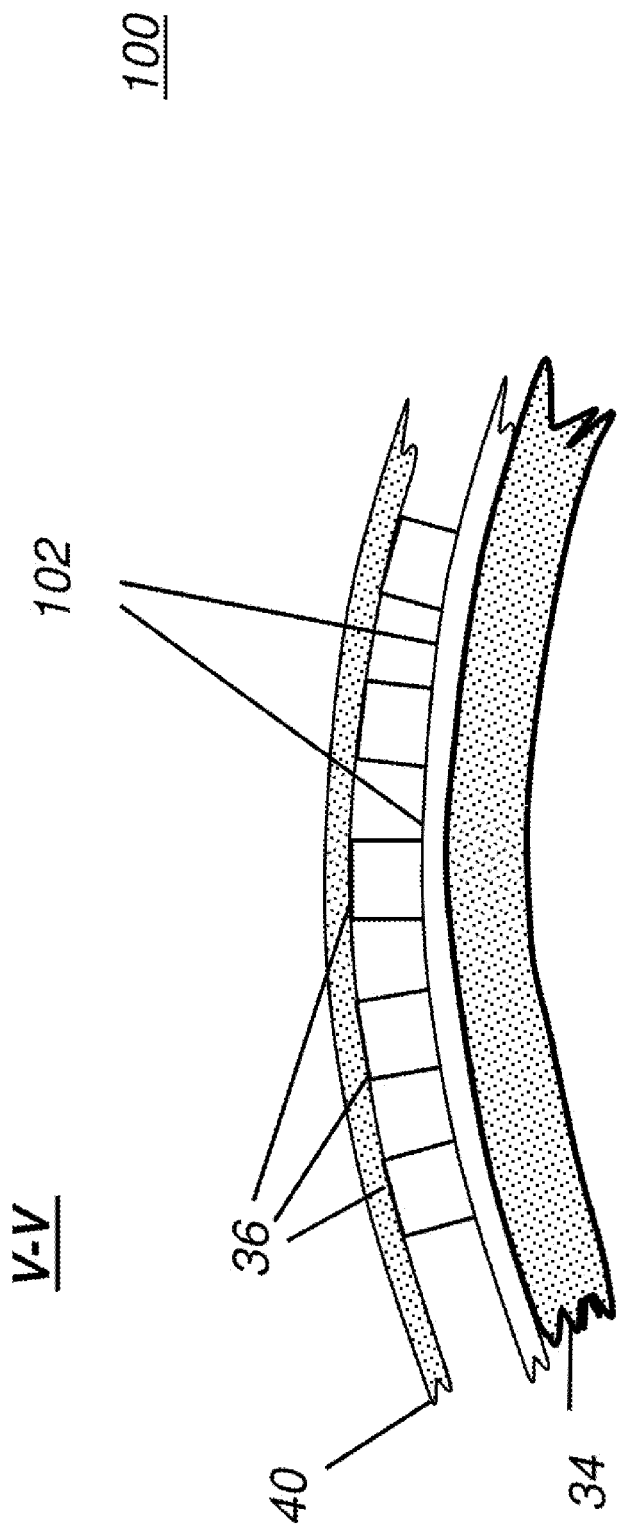
FIG. 12F is a side view showing polarized eyeglasses having a photochromic material deposited onto the substrate, with elongated structures formed onto the substrate for providing a wire grid polarizer.

The side view of FIG. 12F shows an alternate embodiment with photochromic material 102 deposited onto substrate 34 and elongated structures 36 formed thereon. Alternately, photochromic material 102 can be provided as part of substrate 34. A sealant layer 40 is also provided.

With respect to the examples of FIGS. 12A through 12F, it should again be noted that elongated features 36 and supporting features for photochromic behavior can be formed on the outer (convex) surface of the eyeglass lens or on the inner (generally concave) surface.

In one embodiment, elongated structures 36 are themselves formed from a material or combination of materials that provide both photochromic behavior and a complex index of refraction. In this way, wire grid polarizer 30 acts as both polarizer and photochromic material. For example, graphene, having a complex index of refraction, can be mixed with a photochromic material to form a solution that can be applied to the lens surface in a grid pattern, such as in grooves, as described previously. Aerogel and other added layers can be used with this material, as described above with reference to FIGS. 12A-12F.

The side view of FIG. 13 shows an embodiment of eyeglasses 44 that use an electrochromic material 104, such as a liquid crystal (LC) material, deposited between two wire grid polarizers 110 that extend along the surface of the curved lens 32. In this embodiment, the gap between wire grid polarizers 110 is on the order of a few microns. Elongated structures 36 of one or both wire grid polarizers 110 serve as electrodes for LC orientation and, optionally, also serve as alignment structures for anchoring the LC modules. Enlarged area B is shown in FIG. 14.

Figure 14:
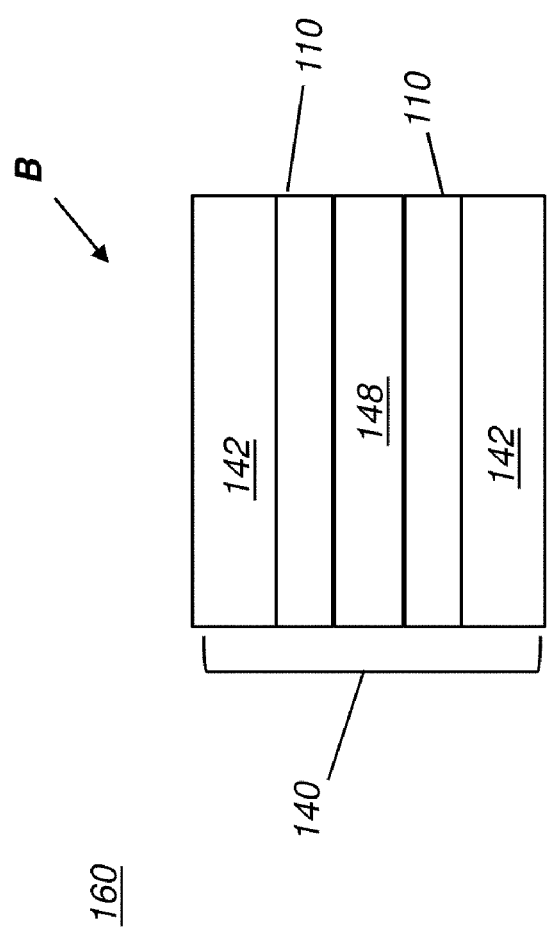
FIG. 14 is an enlarged side view showing the arrangement of layers used in the eyeglass embodiment of FIG. 13.

In FIG. 14, LC panel 140 uses two wire grid polarizers 110 that provide the dual functions of alignment layers and electrodes for controlling the opacity of liquid crystal 148.

Figure 15:
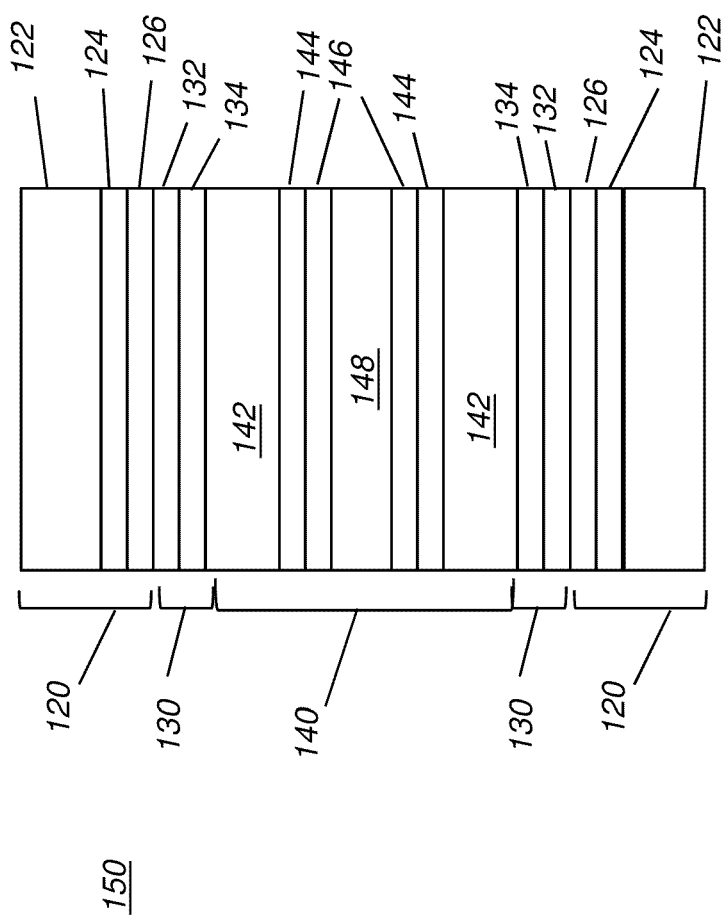
FIG. 15 is an enlarged side view of a conventional liquid crystal device.

By way of comparison, FIGS. 14 and 15 show cross-sectional views of LC shutter 160 that utilizes the wire grid polarizers of the present invention and a conventional LC shutter 150 that does not use wire grid polarizers. In the conventional design of FIG. 15, two polarizers 120 are shown, one on each side of an LC panel 140 with its encompassing compensation films 130. The polarizers are on the input and output sides of the panel. Each polarizer 120 has a film substrate 122, a PVA (polyvinyl alcohol) layer 124, and an adhesive layer 126. Each compensation film 130 has a film layer 132 and an adhesive layer 134. LC panel 140 has, sandwiched between an upper and lower layer of glass 142, paired transparent electrodes 144 and alignment layers 146 that encase the liquid crystal 148.

It can be readily seen that in the embodiment of FIG. 14, LC shutter 160 has a much simpler design than the conventional arrangement of FIG. 15. The two wire grid polarizers 110 are on the inner sides of the LC panel windows, in contact with the LC material and provide both alignment and electrode functions. An additional advantage relates to eliminating the need for compensation films 130. Because wire grid polarizers 110 of the present invention can be formed on a curved surface, the liquid crystal does not need to handle a wide range of incident angles, so that compensation may not be needed. This simplifies manufacture and represents a possible cost savings over conventional approaches.

Figure 16:
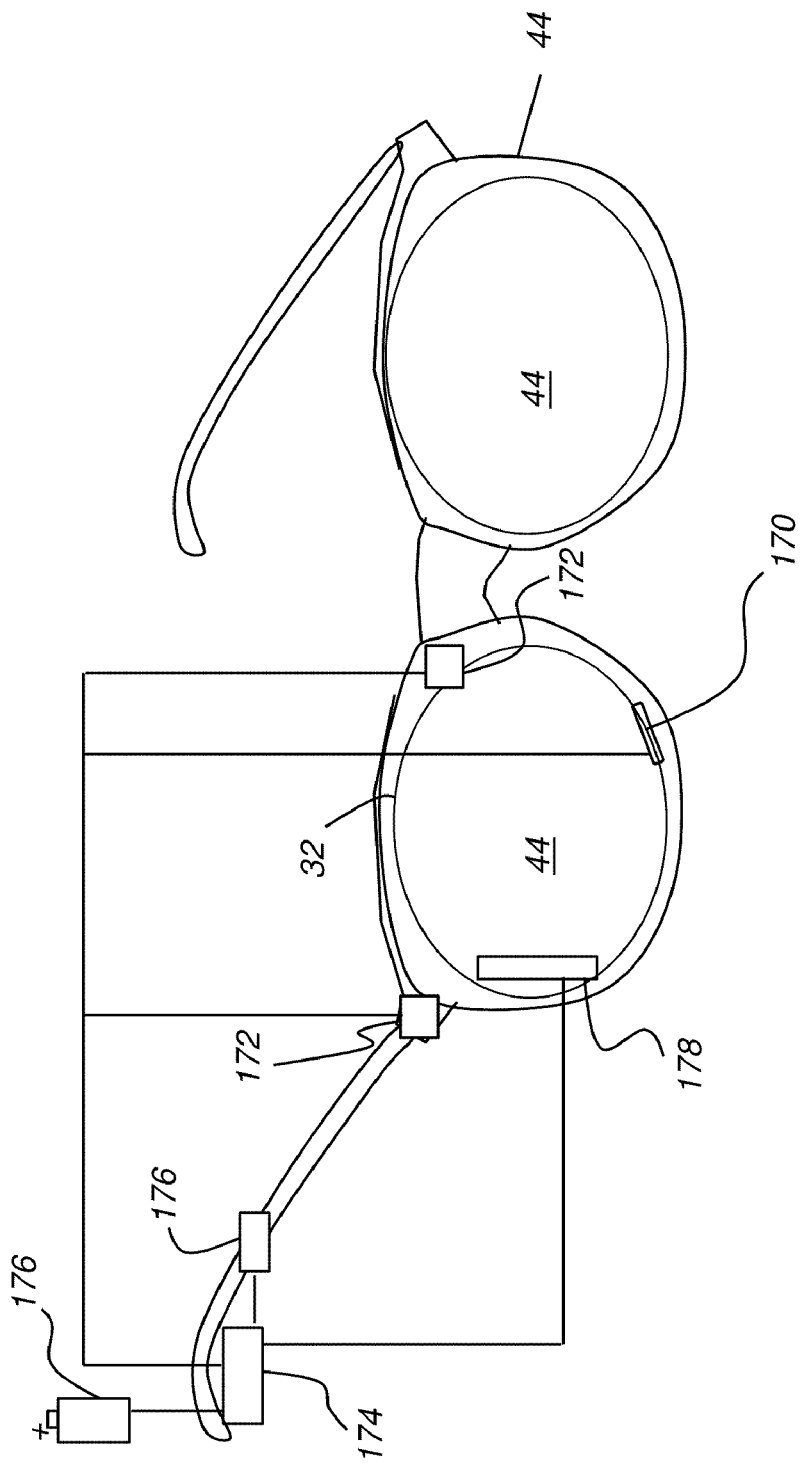
FIG. 16 is a perspective view showing eyeglasses with one or more sensors and a heater element.

The use of light-responsive photochromic and electrochromic materials along with wire grid polarizers as part of eyeglasses 44 offers a number of additional advantages, as shown by example in FIG. 16. To help compensate for more sluggish response of photochromic and electrochromic materials at colder temperatures, a heater element 170 is provided for eyeglasses 44. One or more sensors 172 are provided for sensing ambient temperature and other variables. Additionally, sensors 172 can be provided for detecting laser light or bright light sources or determining light spectral content, and directing this information to a remote computer (not shown) or to a microprocessor 174 on the eyeglasses themselves, thereby forming a control loop. A battery or other power source 176 is included as part of the eyeglasses. An electrode 178 can be controlled by microprocessor 174 to adjust voltage bias along the curved, elongated structures that provide the polarizer. In another embodiment, referring back to FIG. 11, separate electrodes are provided for different zones or sections of eyeglasses 44 so that electrochromic response can be modified over just a portion of the lens.

In yet another embodiment, a user control 176 is provided for setting a variable voltage bias across wire grid elements. This allows adjustment of opacity or color according to viewer preference.

Figure 17A:
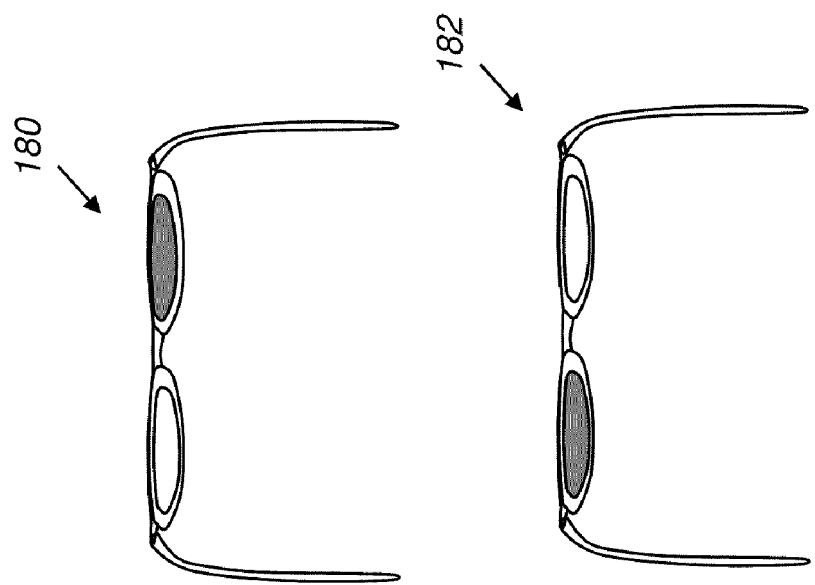
FIG. 17A is a top view showing polarized eyeglasses used as shutter glasses.

The combined use of electrochromic materials with wire-grid polarized lenses is advantageous for a number of applications. When used with liquid crystal materials, polarized shutter glasses can be equipped for 3-D viewing, such as for 3-D TV, for example. Referring to the top views of FIG. 17A, shutter glasses, shown in different states at 180 and 182, repeatedly cycle the light to left and right eyes of the viewer, many times per second in conjunction with display timing, using the controllable opacity of the liquid crystal materials that respond at higher speeds. The electrochromic LC materials can be materials used currently in LC display panels and can alternately include faster ferro-electric materials. Shutter activity can be controlled using the wire grid structures themselves as electrodes. In this application, the electrochromic material is controlled to have the same polarization axis as the wire grid polarizer for transparency and to have a polarization axis that is orthogonal to that of the wire grid polarizer for a fully opaque or shuttered state. The use of wire grid polarized lenses can help to speed shutter timing. It should be noted, however, that the amount of light is reduced with shutter glasses of this type due to polarization.

Figure 17B:
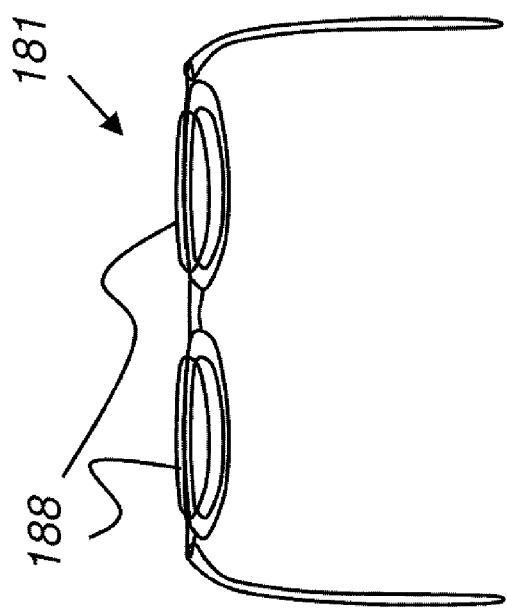
FIG. 17B is a top view showing polarized eyeglasses with retarders for circularly polarized light.

In 3-D TV, polarizing eyewear is used instead of shutters. There is no switching between eyes, as with the shutter embodiment of FIG. 17A. Instead, orthogonal polarizations are used to differentiate left and right eye images. For 3-D TV applications, orthogonal linear polarization states could be used or, alternately, circularly polarized light, clockwise for one eye, counterclockwise for the other. As shown in FIG. 17B, an additional retarder 188, such as a quarter-wave plate, must then be provided as part of eyeglasses 181 or between the eyeglasses and display screen to convert the incident circularly polarized light to linearly polarized light that can then be directed to the curved LC stack that uses wire grid polarizers. One retarder 188 provides circular polarization for one eye (for example, clockwise), the other retarder 188 provides circular polarization of the alternate type (for example, counter-clockwise) for the other eye. Photochromic or electrochromic materials may or may not be used in eyeglasses 181 equipped for 3-D TV.

Figure 18:
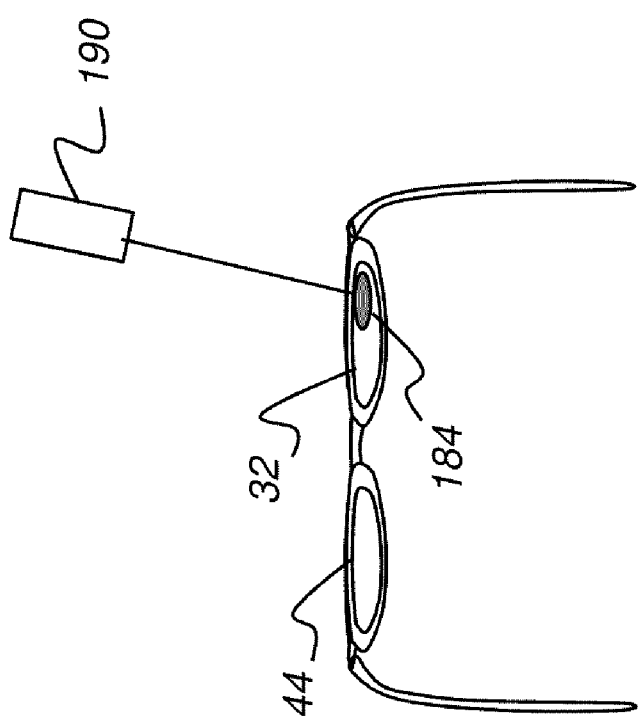
FIG. 18 is a top view showing eyeglasses that quickly change opacity over a zone in response to incident light.

Other applications that can take advantage of the improved response time of electrochromic materials with wiregrid polarizers include eyewear designed for protection from bright light or laser light sources. One or more sensors incorporated in the eyeglasses, visor, or other optical components for a viewer can detect a bright light source, then adjust electrochromic response over the lens, or over some portion or zone of the lens, within a brief time period. Thus, as shown in the top view of FIG. 18 for example, the area of lens 32 that lies between a potentially harmful light source 190 and the viewer's eye can be locally darkened over a zone 184, without the requirement to darken the complete lens. This can be used for protection from highly coherent light sources such as lasers as well as from very bright incoherent sources, such as light generated during welding, or sunlight entering into a cockpit. Localized darkening of the lens surface can help the viewer to see other objects in the visual field, rather than the alternative behavior, in which the complete lens is darkened under bright light. Control of opacity of a zone can be effected using electrochromic, light-responsive photochromic, or both electrochromic and light-responsive photochromic materials in conjunction with the wire grid polarizers described earlier, using one or more elongated structures of the polarizer as an electrode.

In an alternate embodiment, photovoltaic response from forming thin transparent films of nickel hydroxide [Ni(OH)2] and titanium dioxide [TiO2] on glass used to provide electrochromic behavior over a local zone or region of the eyeglass, visor, or other eyewear, or on a windshield or other structure, in the manner described previously with reference to FIG. 18. An additional third wiregrid polarizer can be provided to support the photovoltaic behavior.

Advantageously, embodiments of the present invention allow the combination of wire grid polarizers and light-responsive photochromic and electrochromic materials on optics that have curved surfaces. This allows the development of optical components having irregular shapes, for example. Other advantages include the capability for using photochromic materials in a fluid or liquid form, speeding response time for the photochromic effect.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

| PARTS LIST | |
|---|---|
| 10. | Object |
| 11. | Surface |
| 12. | Polarized eyewear |
| 30. | Wire grid polarizer |
| 31. | Lens |
| 32. | Lens |
| 33. | Layer |
| 34. | Substrate |
| 35. | Elongated masking structure |
| 36. | Elongated structure |
| 37. | Interference |
| 38a, 38b. | Layer |
| 39. | Photoresist layer |
| 40. | Layer |
| 42. | Channel |
| 43. | Layer |
| 44. | Eyeglasses |
| 45. | Mold |
| 47. | Microstructure |
| 48. | Groove |
| 49 | Elongated nano particle |
| 50, 51. | Zone |
| 100. | Polarized eyewear |
| 102. | Photochromic material |
| 104. | Electrochromic material |
| 106. | Insulator |
| 110. | Wire grid polarizer |
| 120. | Polarizer |
| 122. | Film substrate |
| 124. | PVA layer |
| 126. | Adhesive layer |
| 130. | Compensation film |
| 132. | Film layer |
| 134. | Adhesive layer |
| 140. | LC panel |
| 142. | Glass |
| 144. | Transparent electrode |
| 146. | Alignment layer |
| 148. | Liquid crystal |
| 150. | Conventional LC shutter |
| 160. | LC shutter |
| 170. | Heater element |
| 172. | Sensor |
| 174. | Microprocessor |
| 176. | Power source |
| 176. | Control |
| 178. | Electrode |
| 180, 182. | Shutter glasses |
| 184. | Zone |
| 188. | Retarder |
| 190. | Light source |
| B. | View |
| p. | Pitch |
| t. | Thickness |
| w. | Width |
| V. | Transmission axis (vertical) |

The invention claimed is:

1. An article of polarized eyewear having a lens, wherein the lens comprises:
   a first substrate lens material transparent to visible light;
   a pattern of elongated structures formed from at least a second material having a complex index of refraction, wherein the second material is deposited directly onto a curved surface of the first substrate lens material, wherein a pitch between adjacent elongated structures is less than 300 nm and a width of each elongated structure is less than 90% of the pitch; and a photochromic material deposited alongside one or more of the elongated structures.

2. The article of claim 1 wherein the photochromic material is mixed with the second material and deposited along a length direction of the elongated structures.

3. The article of claim 1 wherein the photochromic material is deposited between the elongated structures.

4. The article of claim 1 wherein the photochromic material comprises a fluid.

5. The article of claim 4 further comprising a transparent insulator deposited against the photochromic material.

6. The article of claim 5 wherein the transparent insulator is an aerogel.

7. The article of claim 4 wherein the photochromic material is a liquid crystal material.

8. The article of claim 1 wherein the pattern of elongated structures forms a first wiregrid polarizer and further comprising a second wiregrid polarizer having a curvature and spaced apart from the first wiregrid polarizer.

9. The article of claim 1 wherein the photochromic material is taken from the group consisting of triarylmethanes, stilbenes, azastilbenes, nitrones, fulgides, spiropyrans, naphthopyrans, spiro-oxazines, and quinines.

10. The article of claim 1 wherein the pattern of elongated structures provides a voltage bias to the photochromic material.

11. The article of claim 1 wherein the photochromic material interacts with a second material to provide a photovoltaic response.

12. The article of claim 1 further comprising a heat source for providing heat energy to the photochromic material.

13. The article of claim 7 further comprising one or more light sensors for detecting incident light and wherein the elongated structures provide at least one electrode.

14. The article of claim 1 further comprising a viewer control for setting a variable bias voltage across the photochromic material.

15. A method for fabricating polarized eyewear comprising:
providing a first substrate lens material having a predominantly real index of refraction; and
forming a pattern of segment-wise parallel elongated structures onto a surface of the first substrate lens material, wherein each elongated structure is formed from at least a second material having a complex index of refraction;
shaping the first substrate lens material to provide one or more curved surfaces and to align the pattern of segment-wise parallel elongated structures according to a polarization axis,
wherein the pitch between adjacent elongated structures after shaping is less than 300 nm and the width of each elongated structure is less than 90% of the pitch; and
depositing a photochromic material alongside one or more of the elongated structures.

16. The method of claim 15 wherein depositing the photochromic material further comprises sealing a fluid against the elongated structures.

17. The method of claim 15 wherein depositing the photochromic material comprises depositing a liquid crystal material.

18. The method of claim 17 wherein the pattern of segment-wise parallel elongated structures forms an alignment pattern.

19. The method of claim 17 further comprising providing a voltage bias to the pattern of segment-wise parallel elongated structures for controlling the opacity of the liquid crystal material.

20. An article of polarized eyewear having a lens, wherein the lens comprises:
a first substrate lens material transparent to visible light;
a pattern of elongated structures formed from at least a second material having a complex index of refraction, wherein the second material is deposited directly onto a curved surface of the first substrate lens material,
wherein a pitch between adjacent elongated structures is less than 300 nm and a width of each elongated structure is less than 90% of the pitch; and
a fluid photochromic material deposited between the elongated structures.

\* \* \* \* \*